United States Patent [19]
Link et al.

[11] Patent Number: 5,560,463
[45] Date of Patent: Oct. 1, 1996

[54] FRICTION CLUTCH FOR A MOTOR VEHICLE TRANSMISSION AND A FRICTION CLUTCH HAVING AUTOMATIC ADJUSTMENT FOR WEAR

[75] Inventors: Achim Link, Schweinfurt; Reinhold Weidinger, Unterspiesheim; Heiko Schulz-Andres, Poppenhausen; Klaus Elsner, Schweinfurt; Rainer Wiedmann, Hambach; Ralf Nenninger, Werneck; Michael Weib, Dittelbrunn, all of Germany

[73] Assignee: Fichtel & Sachs AG, Schweinfurt, Germany

[21] Appl. No.: 330,692

[22] Filed: Oct. 28, 1994

[30] Foreign Application Priority Data

Nov. 4, 1993 [DE] Germany .......................... 43 37 613.4

[51] Int. Cl.⁶ ..................................................... F16D 13/75
[52] U.S. Cl. ..................................... 192/70.25; 192/111 A
[58] Field of Search ............................... 192/70.25, 111 A

[56] References Cited

FOREIGN PATENT DOCUMENTS

| | | |
|---|---|---|
| 0568990 | 11/1993 | European Pat. Off. . |
| 3518781 | 11/1986 | Germany . |
| 2176256 | 12/1986 | United Kingdom . |
| 2264989 | 9/1993 | United Kingdom . |

Primary Examiner—Charles A. Marmor
Assistant Examiner—Saul Rodriguez
Attorney, Agent, or Firm—Nils H. Ljungman and Associates

[57] ABSTRACT

A motor vehicle friction clutch with an automatic adjustment for wear of the friction linings, whereby distributed over the circumference of the pressure plate there are several clearance sensors which act on the thrust plate with the interposition of an adjustment device. Each clearance sensor is thereby mounted in a hole in the thrust plate, so that it can move axially against the force of an adapter sleeve.

5 Claims, 13 Drawing Sheets

FIG. 3a
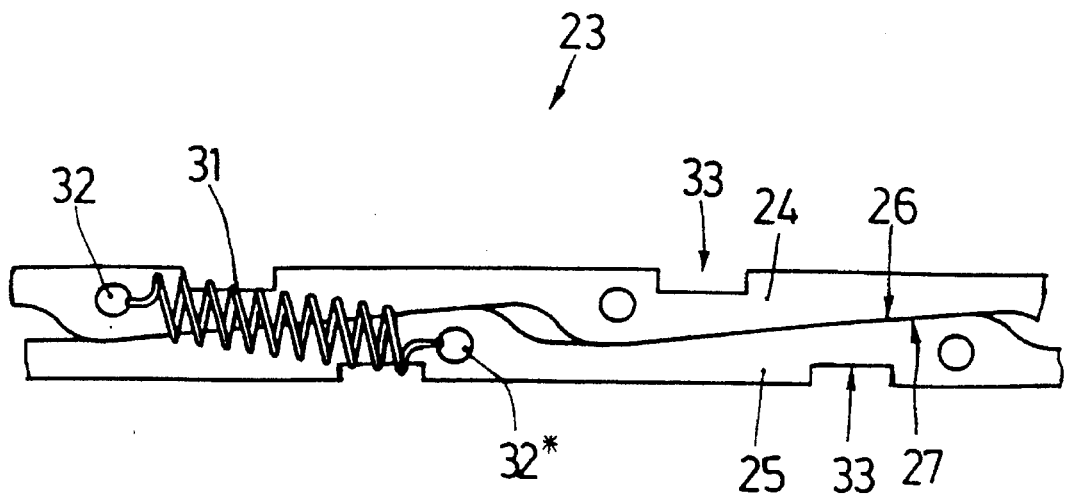
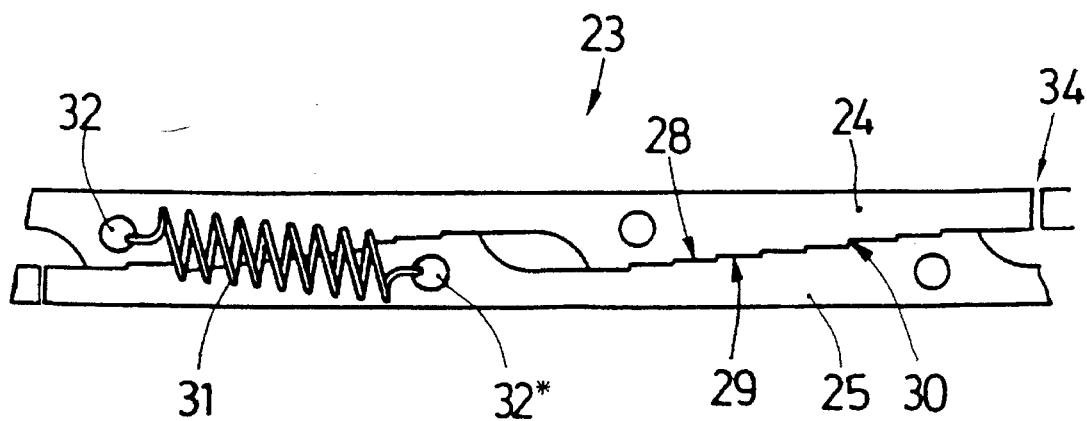
FIG. 3b

B'

B'

B'

1

FRICTION CLUTCH FOR A MOTOR VEHICLE TRANSMISSION AND A FRICTION CLUTCH HAVING AUTOMATIC ADJUSTMENT FOR WEAR

BACKGROUND OF THE INVENTION

1. Field of the Invention

The present invention relates to a motor vehicle friction clutch having an automatic adjustment for wear and also having a clearance sensor. Such a friction clutch can generally include a pressure plate, or thrust plate, which pressure plate is fastened with the interposition of a clutch disc with friction linings, to a flywheel. The pressure plate and the flywheel together define an axis of rotation. The pressure plate is located non-rotationally but axially movably in a clutch housing, and a membrane spring is inserted under prestress between the pressure plate and the clutch housing. The membrane spring makes contact with the pressure plate, whereby this contact takes place with the interposition of an adjustment device. The adjustment device makes possible an axial displacement of the pressure plate away from the membrane spring as a function of the wear of the friction linings of the clutch disc.

2. Background Information

A friction clutch with an automatic adjustment for wear is disclosed, for example, in German Unexamined Patent Application 3518781. In such a friction clutch, there is a friction-loaded, displacement limiting device for the thrust plate with respect to the clutch housing. The displacement limiting device is used to make it possible, when the specified clearance in the displacement limiting device is exceeded during the disengagement process of the friction clutch, for the membrane spring to lift up from from its contact on the thrust plate, so that as a result of the radial displacement of wedge-shaped components, this contact adjusts for the clearance between the membrane spring and the thrust plate by the amount of the wear of the friction linings. A disadvantage of this design can be that the automatic wear compensation is essentially only possible after the displacement limiter device has travelled the distance of the clearance, and then essentially only when the clutch is completely disengaged. Such a design cannot typically be used, for example, with a hydraulic disengagement system, since such a system would automatically adjust for even quite small amounts of wear within the clearance, without actuating the clearance adjustment mechanism as a function of the wear of the friction linings.

OBJECT OF THE INVENTION

The object of the present invention is therefore to create an automatic wear adjustment device which is reliable, which can be adjusted as continuously as possible, and which can be combined with a hydraulic clutch actuation device.

SUMMARY OF THE INVENTION

The present invention teaches that this object can be accomplished by means of one or more clearance sensors, preferably distributed around the circumference of the pressure plate, each of which clearance sensors preferably acts by means of an actuator lever. Each actuator lever preferably extends radially inward, and either directly or indirectly is associated with a component of the adjustment device. Each clearance sensor can preferably be mounted so that it can be moved axially, preferably by means of a sliding pin in a hole, which hole can preferably be oriented substantially parallel to the axis of rotation in the pressure plate. The clearance sensors can be held in place preferably by means of friction, in that an adapter sleeve is preferably located on the sliding pin, and is in frictional contact preferably with the hole and is under radial prestress in the hole. Each clearance sensor preferably has an axial stop which is integral with the housing, and which limits the motion of the clearance sensor in relation to the flywheel. The adjustment device preferably penetrates into the enlarged space between the clearance sensor and the pressure plate during the disengagement process which follows the occurrence of the wear.

In other words, and in accordance with one embodiment of the present invention, each clearance sensor can preferably have an axial stop, which can possibly be embodied in the sliding pin and the hole in the pressure plate, and the frictional engagement between the two, which axial stop can serve to limit movement of the clearance sensor in relation to the flywheel. Further, since the pressure plate is preferably attached to the housing, this axial stop (sliding pin and hole) could be considered to be "integral" with the housing since the hole is located in the pressure plate.

As a result of the selected design, when wear occurs to the friction linings during the clutch engagement process, each clearance sensor is preferably pushed through the stop, which is preferably permanently attached to the housing, in relation to the thrust plate by the amount of the wear, and the wear adjustment is then preferably performed during the next clutch disengagement process. This design therefore makes possible an essentially continuous adjustment for wear, to the extent that the adjustment device operates continuously. This design can also essentially guarantee that the membrane spring remains in the same installed position over the entire life of the friction clutch, so that an optimal efficiency can be specified even during the design phase. This efficiency can essentially be retained over the entire useful life of the clutch, so that either a higher application force can be generated with the same configuration of the membrane spring, or a smaller membrane spring can be used to achieve a given application force.

In other words, and in accordance with one embodiment of the present invention, when wear occurs to the friction linings during the engagement process of the clutch, the pressure plate will be moved axially toward the flywheel by an increased distance due to the wear of the linings, and, since the pressure plate can move independently of the clearance sensor with its sliding pin, the clearance sensor will preferably remain in its original position with respect to the flywheel. Thus, in one sense, the clearance sensor can be considered as being pushed "through the stop", i.e. the sliding pin slides in the hole due to the movement of the pressure plate towards the flywheel.

Each of the sliding pins can preferably be permanently connected to an actuator lever on the side of the thrust plate away from the flywheel. Each clearance sensor preferably has a simple design and is easy to manufacture, and the clearance sensors are located at numerous locations on the circumference of the pressure plate.

Each clearance sensor can preferably be fixed and secured against rotation in relation to the opening in the pressure plate, so that the clearance sensors will not be twisted around the axis of the hole.

The actuator lever can thereby be in direct contact with the adjustment device, and a force can be exerted on the pressure plate preferably by a release spring in the release direction to assist in the release movement. The functions of clutch actuation (engagement and disengagement) and the automatic wear adjustment are thus clearly separated from one another, so that the components in question can be designed specifically for their respective purposes. In each case, it should be guaranteed that the force exerted on the pressure plate by the release spring in the release direction is not greater than the force of the adjustment device to compensate for the amount of wear.

In other words, the force of the release spring on the pressure plate should not be greater than the force of the adjustment device, otherwise, the adjustment device could be overpowered by the release spring and thus be prevented from compensating for the wear to the friction linings of the clutch disc.

In accordance with one embodiment of the present invention, it is also possible that the actuator lever or levers can be in contact with the adjustment device with the interposition of the membrane spring. In this case, the release spring for the pressure plate can essentially be eliminated, since the release process can occur essentially automatically by means of the actuator levers of the clearance sensors.

The friction clutch equipped with the automatic wear compensation feature can therefore be designed as a "pushed" clutch. One of the advantages of such a "pushed clutch" is that it essentially does not cause any problems during the assembly and disassembly of the engine and the transmission with regard to the clutch release bearing and the clutch release system, since the clutch release bearing extends from the transmission toward the membrane spring and is typically in axial contact with the latter before and after the assembly.

When a clutch housing is used which has an essentially cup-shaped area, the present invention teaches that the openings for the passage of the actuator levers of the clearance sensors can be designed so that they can be used simultaneously to prevent the actuator levers from twisting. The result is a very simple solution to prevent the clearance sensors from twisting.

It is also possible, essentially without additional measures, to perform the adjustment for wear by using the clearance sensors in a "pulled" friction clutch. The specific advantages of the pulled friction clutch are thereby retained, which include the fact that the layout of the membrane spring is less problematic and the displacement relationships can be designed more favorably with regard to the actuation of the clutch release mechanism.

Each actuator lever can thereby run on the outside of the clutch housing and be guided through an opening in the clutch housing to the membrane spring, or through an opening in the membrane spring to the adjustment device, and this opening can thereby prevent the actuator levers from twisting. This opening, through which the actuator lever is preferably guided, can thus be simultaneously used to prevent twisting.

It can also be advantageous to provide measures to increase the friction between the adapter sleeve and the hole. Such measures can be designed to define the amount of friction at this point. Such measures can, for example, comprise providing the adapter sleeve and/or the hole with a surface which has a relatively high coefficient of friction. Such a measure can be applied, for example, by coating the surface with a corresponding friction material. However, it is also possible to provide a corrugated or knurled surface. In any case, this measure can be taken to essentially guarantee that the clearance sensors remain reliable even under special operating conditions of the internal combustion engine (i.e. vibrations).

The present invention also teaches that it can be advantageous if measures to prevent rust are provided between the adapter sleeve and the hole. Such a measure can consist, for example, of providing a bushing in the thrust plate, in the inside diameter of which bushing the adapter sleeve is preferably guided. Such a bushing can be made of an appropriate material, so that oxidation or rust can be prevented, and uniform friction conditions can essentially be guaranteed over the entire useful life of the clutch.

In accordance with one particularly advantageous configuration of the adjustment device, two rings can be provided which are preferably located axially one behind the other. The two rings can be guided on a guide diameter of the thrust plate and can be disposed substantially concentrically to the axis of rotation, with one of the rings being axially supported on the pressure plate, and the other ring being supported on the membrane spring. Both rings are preferably supported in the areas facing one another by means surfaces which preferably represent one or more sloped areas around the circumference.

There can also be a spring device which braces the two rings with respect to one another, and when wear occurs, rotates both of them opposite one another to increase the amount of axial space which is occupied by the two rings. As a result of this splitting of the adjustment device into two rings located axially one behind the other, and as a result of the arrangement of the sloped portions of the surface in the areas of the two rings facing one another, it is possible that both rings can be provided facing axially outward, i.e. on one hand facing the thrust plate and on the other hand facing the membrane spring, with a simple encircling edge, whereby the thrust plate can also be provided with a corresponding edge, which can significantly simplify the manufacturing process. As a result of the location of the spring device between the two rings, it is possible for both rings to be easily installed on the thrust plate as a unit, without having to be concerned about the exact circumferential coordination between the rings and the thrust plate.

In one particularly simple embodiment, i.e. one which is particularly simple to manufacture, the areas of the surface of the two rings preferably run continuously as a function of the specified slope.

However, it can also be advantageous if the partial surfaces of the two rings are manufactured from individual partial pieces which each run stepped fashion, substantially parallel to a plane which is perpendicular to the axis of rotation, and each of the partial pieces can be provided with an axial step. Such a configuration has the advantage that neither as a result of the spring device nor as a result of the application force of the membrane spring is a circumferentially-directed force component exerted on the two rings in either transverse direction. In such an embodiment with partial surfaces and where each partial surface has a step, the adjustment action is performed when, as a result of the relaxation of the force exerted by the membrane spring during the clutch release process, the vibrations of the internal combustion engine guarantee that the partial surfaces can be released or raised beyond the respective step, so that a relative rotation of the two rings becomes possible. The individual steps must thereby typically be kept on an order of magnitude of approximately 0.2 mm. Of course, slight variations of this magnitude are also conceivable, thus, the magnitude of the steps should not be taken as limited to the given magnitude.

The present invention also teaches that the spring device can be comprised of at least one tension spring which runs essentially tangentially and on the inside of the two rings, and which is preferably suspended by one end in an opening of the one ring, and by the other end in an opening of the other ring. Such a configuration can typically be easily pre-assembled and then inserted into the pressure plate.

In accordance with one particularly economical embodiment of the present invention, the two rings can be made of sheet metal strips. Such sheet metal strips typically produce very little waste during the manufacturing process (preferably stamping), and can then be easily bent into a ring. Of course, other suitable flexible materials could be used in manufacturing the two rings.

The sheet metal rings bent in this manner can thereby be designed so that they have a closed circumference (e.g. closed by welding or other suitable method), but they can also be open on the circumference, and therefore can have a gap. Such a design is particularly simple to manufacture.

When the word invention is used in this specification, the word "invention" includes "inventions", that is, the plural of "invention". By stating "invention", the applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and in the event that there is more than one invention, that these inventions may be patentable and non-obvious one with respect to the other.

One aspect of the invention resides broadly in a transmission for a motor vehicle, the transmission comprising: a flywheel fastened to rotate with the crankshaft of an internal combustion engine; a transmission input shaft; a clutch housing; a clutch disc disposed within the housing, the clutch disc defining an axis of rotation and an axial direction parallel to the axis of rotation; the clutch disc being disposed on the transmission input shaft; a pressure plate for engaging and disengaging the clutch disc with the flywheel; the clutch disc being disposed between the pressure plate and the flywheel; the clutch disc comprising: friction lining means for contacting the flywheel and the pressure plate upon engagement of the clutch disc; biasing means disposed between the clutch housing and the pressure plate for biasing the pressure plate towards the flywheel; means for adjusting the axial distance between the pressure plate and the flywheel upon wear of the friction lining means; at least one means for sensing wear of the friction lining means; the at least one sensing means comprising: projection means; the projection means comprising: a first portion extending towards the adjusting means; the first portion being operatively connected to the adjusting means to permit the adjusting means to adjust the axial distance between the pressure plate and the flywheel during a disengagement process of the clutch disc which follows an engagement process of the clutch disc wherein wear of the friction lining means has occurred; a second portion disposed in the pressure plate; means for providing friction for frictionally positioning the second portion with respect to the pressure plate; and the means for providing friction comprising: means for permitting sliding axial movement, against the friction, of at least one of: the pressure plate, and the at least one sensing means, one with respect to the other.

Another aspect of the invention resides broadly in a friction clutch for a motor vehicle, the friction clutch comprising: a clutch housing; a clutch disc disposed within the housing, the clutch disc defining an axis of rotation and an axial direction parallel to the axis of rotation; the clutch disc having means for being disposed on a transmission input shaft; a pressure plate for engaging and disengaging the clutch disc with a flywheel of an internal combustion engine; the clutch disc being disposed between the pressure plate and the flywheel; the clutch disc comprising: friction lining means for contacting the flywheel and the pressure plate upon engagement of the friction clutch; biasing means disposed between the clutch housing and the pressure plate for biasing the pressure plate towards the flywheel; means for adjusting the axial distance between the pressure plate and the flywheel upon wear of the friction lining means; at least one means for sensing wear of the friction lining means; the at least one sensing means comprising: projection means; the projection means comprising: a first portion extending towards the adjusting means; the first portion being operatively connected to the adjusting means to permit the adjusting means to adjust the axial distance between the pressure plate and the flywheel during a disengagement process of the friction clutch which follows an engagement process of the friction clutch wherein wear of the friction lining means has occurred; a second portion disposed in the pressure plate; means for providing friction for frictionally positioning the second portion with respect to the pressure plate; and the means for providing friction comprising: means for permitting sliding axial movement, against the friction, of at least one of: the pressure plate, and the at least one sensing means, one with respect to the other.

BRIEF DESCRIPTION OF THE DRAWINGS

The present invention is explained below in greater detail with reference to the embodiments illustrated in the accompanying drawings, in which:

FIG. 2 shows a partial section through a variant of the friction clutch illustrated in FIGS. 1 and 1a;

FIGS. 3aa and 3bb show substantially the same views as FIGS. 3a and 3b, respectively, but show additional components;

FIG. 8aa is substantially the same view as FIG. 8a, but shows additional components.

DESCRIPTION OF THE PREFERRED EMBODIMENT

Figure 1:
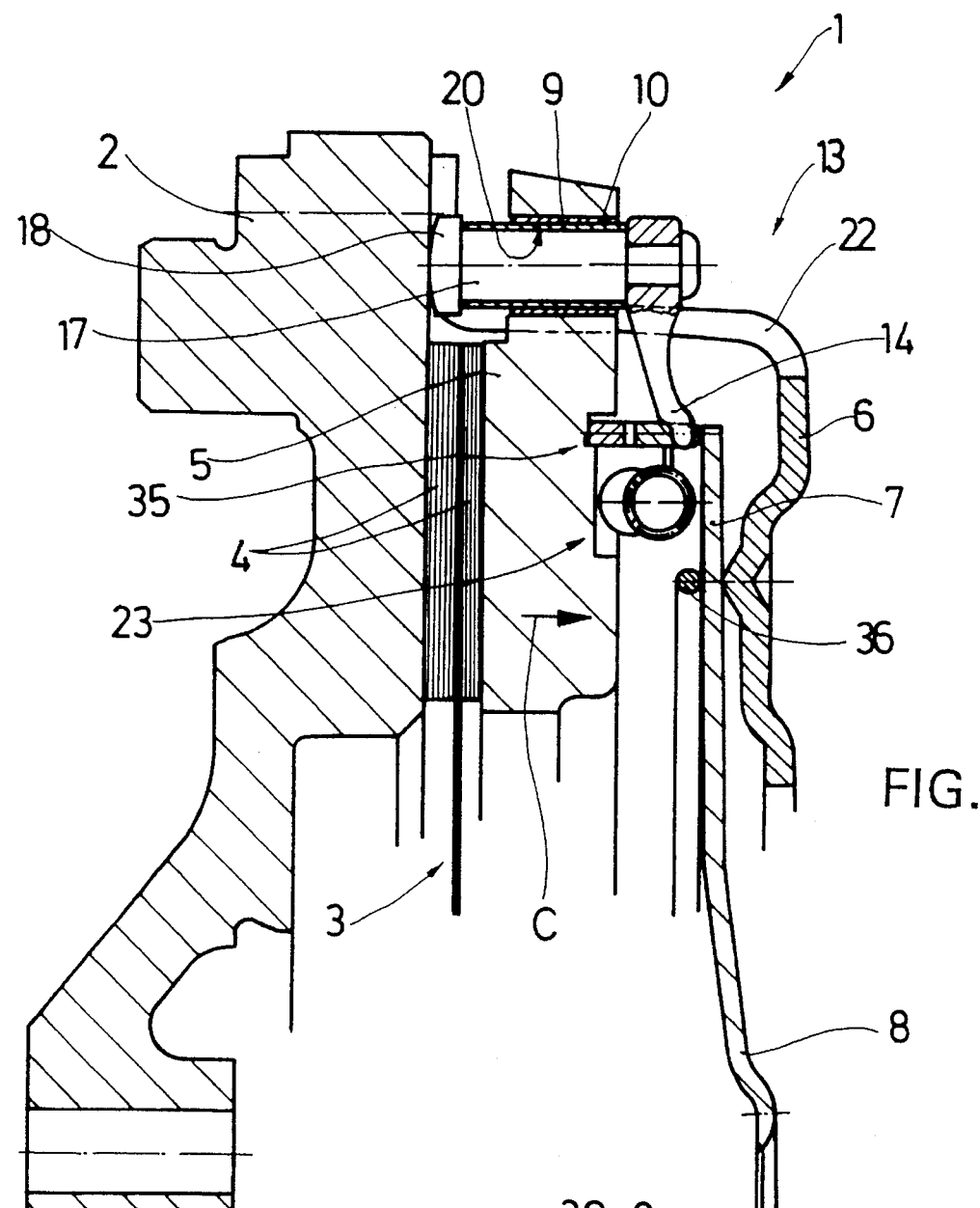
FIG. 1 shows the upper half of a longitudinal section through a friction clutch.

FIG. 1 shows the upper half of a longitudinal section through a friction clutch 1, which, in the depicted embodiment, can be designated as a "pushed" friction clutch. A flywheel 2 can preferably be fastened to a crankshaft (not shown) of a motor vehicle, and can rotate, along with friction clutch 1, around a common axis of rotation 11. Fastened to the flywheel 2 there can typically be a clutch housing 6, in which a pressure or thrust plate 5 can be fastened non-rotationally. The pressure plate 5 can preferably be axially movable within the housing 6. The non-rotational connection of the pressure plate 5 to the clutch housing 6 can preferably be provided by means of tangential leaf springs which are not shown in the drawing, but which are generally well known and will not be further discussed here. Further, other types of connections might also be possible.

Between the thrust plate 5 and the flywheel 2, a clutch disc 3 with friction linings 4 can preferably be disposed. The clutch disc 3, with its friction linings 4, can preferably be attached to a transmission shaft (not shown), for example, by means of teeth which can preferably engage with splines or teeth of the transmission shaft. Further, the clutch disc 3 can preferably be clamped between the pressure plate 5 and the flywheel 2 in order to engage the transmission shaft (not shown) with the flywheel 2. The clamping force can preferably be applied by a membrane spring 7, which can preferably be located on the inside of the clutch housing 6. The membrane spring 7 can preferably be fixed, on an intermediate diameter, by means of spacer bolts (not shown), and can be supported on one hand on the clutch housing 6 in the vicinity of an area 36a of the clutch housing 6 (see FIG. 1a), and on the other hand on a wire ring 36. Radially inward, the membrane spring 7 can be provided with flexible tabs 8, and the membrane spring 7 can be supported in a radially outer portion 7a (see FIG. 1a) by means of an adjustment device 23, which adjustment device 23 can preferably be disposed on the thrust plate 5. The design of the adjustment device 23 is shown in more detail in FIGS. 3a, 3b, 3aa, and 3bb.

The thrust plate 5 can preferably be provided on the circumference, in one or more positions about the circumference, with holes 20, the longitudinal axes of which holes 20 preferably run substantially parallel to the axis of rotation 11. These holes 20 can be represented, for example, by a bushing 10 preferably located in the thrust plate 5. In each hole 20 a sliding pin 17 preferably extends, which sliding pin 17 can preferably be provided with a head 18, outside the hole 20, in the vicinity of the flywheel 2. Each sliding pin 17 can also preferably have an actuator lever 14 on the other end thereof. This actuator lever 14 can preferably extend outside of the hole 20, and also substantially perpendicular to the hole 20. The actuator lever 14 and the sliding pin 17 can be permanently connected to one another, and the actuator lever 14 can preferably extend radially inward and through a hole 22 in the clutch housing 6.

When the friction clutch 1 is engaged, and when there is no wear of the friction linings 4, each sliding pin 17 preferably lies with its head 18 on an area of the flywheel 2, and each actuator lever 14 can preferably be in contact with a component of the adjustment device 23. Each sliding pin 17 can preferably be surrounded by an adapter sleeve 9, which adapter sleeve 9 is preferably in frictional contact with the hole 20, more particularly bushing 10 in hole 20, and is preferably under radial internal stress in the hole 20 of the bushing 10. The adapter sleeve 9 can preferably be provided with a slight clearance-with respect to the sliding pin 17 both radially and axially, so that the function of the adapter sleeve 9 can essentially not be influenced by the sliding pin 17.

Figure 1A:
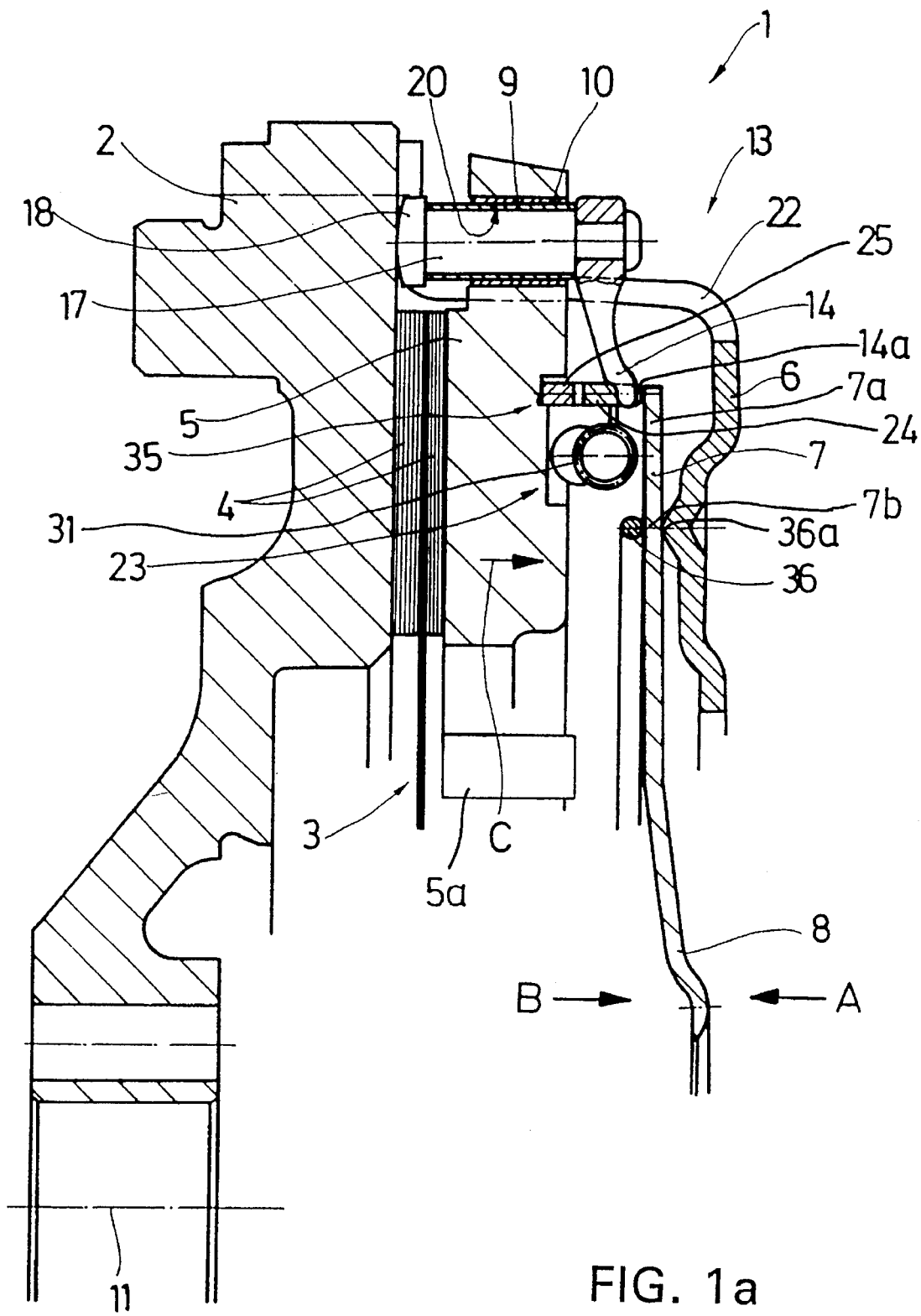
FIG. 1a shows substantially the same view as FIG. 1, but shows additional components.
Figure 3C:
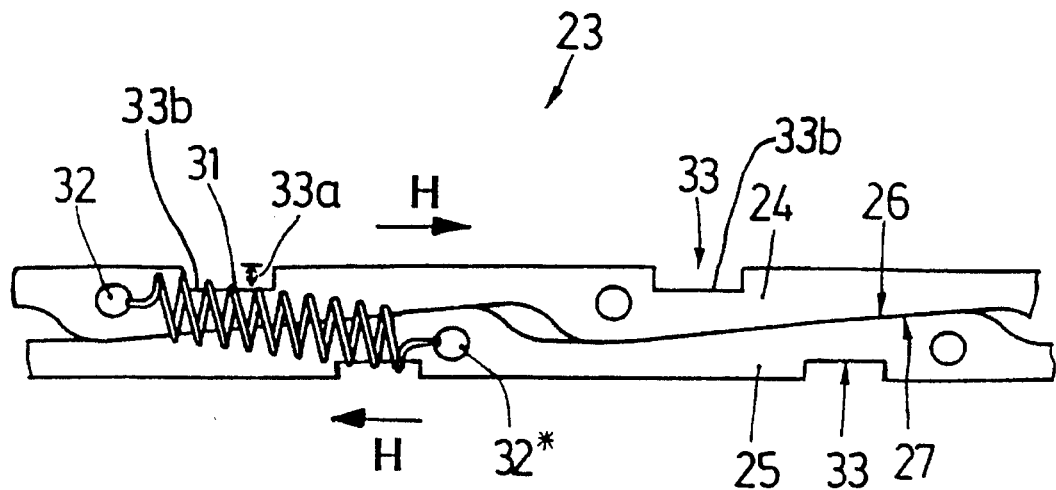
FIGS. 3a and 3b show two partial views of two variants of the adjustment device.
Figure 3D:
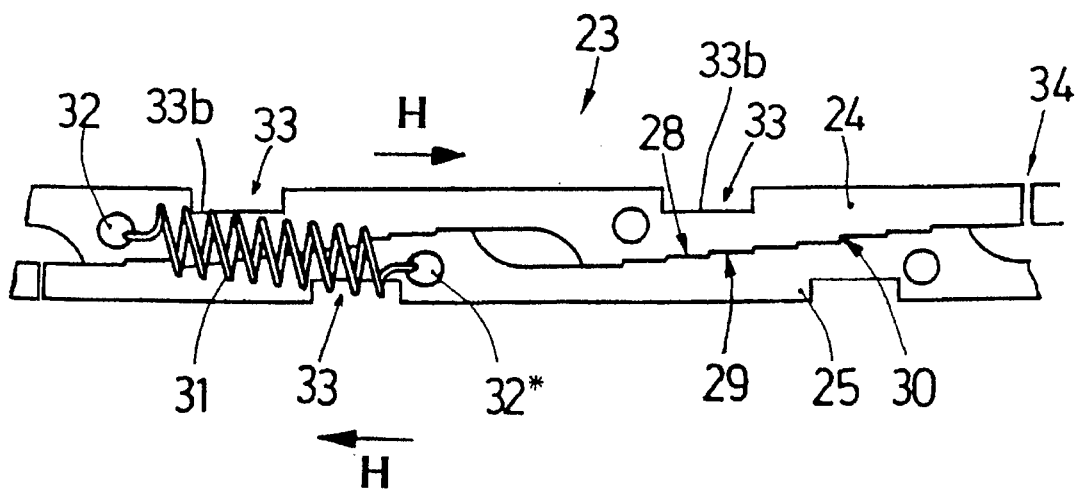

The adjustment device 23 is illustrated in further detail in FIGS. 3a, 3b, 3aa and 3bb, which show two possible embodiments of the adjustment device 23. FIG. 3a shows an adjustment device 23 which is preferably inserted into the friction clutch 1 as illustrated in FIGS. 1 and 1a. The adjustment device 23 can generally include two rings 24 and 25, which rings 24 and 25 can, in accordance with one embodiment of the present invention, preferably be made of sheet metal, and which rings 24 and 25 can preferably be in axial contact with one another by means of diagonal, or sloped, partial surfaces 26 and 27, respectively. The two rings 24 and 25 can preferably be provided with openings 32 and 32*, in which the respective ends of a tension spring 31 can preferably be suspended. The tension spring 31 is preferably tensioned to twist the two rings 24 and 25 in opposite directions in relation to one another, so that by means of the partial surfaces 26 and 27, it is possible to increase the axial distance occupied by the two rings 24 and 25.

The rings 24 and 25, within the clutch housing 6, are preferably oriented substantially concentrically to the axis of rotation 11 on a guide diameter 35 (see FIGS. 1 and 1a) of the thrust plate 5. When the friction clutch 1 is engaged, the rings 24 and 25 preferably fill the axial space between the thrust plate 5 and the external contour of the membrane spring 7. At least the ring 24, which is disposed nearest the membrane spring 7, can preferably be provided with recesses 33 into which the ends of the actuator levers 14 can preferably extend. The depth of the recesses 33, preferably in all cases, should be greater than the axial extension of the ends of the actuator levers 14, preferably so that a clearance 14a (see FIG. 1a) can be maintained between the levers 14 and the membrane spring 7. It is desirable that such a clearance 14a be greater than the maximum wear of the friction linings 4 during one clutch engagement process, so that the rings 24 and 25 can be moved as a result of the wear of the linings 4 while lever 14 stays substantially in place.

In other words, and in accordance with at least one embodiment of the present invention, the recesses can preferably have a width dimension 33a (see FIG. 3aa), which extends substantially parallel to the axis of rotation 11 when the rings 24 and 25 are installed in the clutch 1, as shown in FIGS. 1 and 1a. This width dimension 33a should be greater than an axial width of the actuator levers 14, and also greater than the maximum axial wear distance of the friction linings 4 during one clutch engagement.

It is naturally of practical advantage, from a manufacturing point of view and from an assembly point of view, if the two rings 24 and 25 are identical to one another, so that both are provided with recesses 33, even if the recesses 33 are only necessary for one ring, such as ring 24. Thus, essentially, no particular attention to the orientation of the rings 24 and 25 would be necessary during assembly.

The operation of the friction clutch 1 in connection with the rings 24 and 25 of the adjustment device 23 is given herebelow. During the assembly of the friction clutch 1, the sliding pin or pins 17 are preferably assembled together with the adapter sleeves 9 so that when the friction clutch 1 is engaged, the heads 18 of the sliding pins 17 preferably come into contact with the flywheel 2. In this engaged state, as illustrated in FIGS. 1 and 1a, the friction linings 4 are preferably pressed by the thrust plate 5 against the flywheel 2, the sliding pins 17 are in contact with the flywheel 2, and the rings 24 and 25 of the adjustment device 23 are preferably in contact on one side with the thrust plate 5, and on the other side with the membrane spring 7. The free space between the actuator lever 14 and the thrust plate 5 is essentially completely occupied by the two rings 24 and 25.

If the friction clutch 1 is released or disengaged, force is exerted on the flexible tabs 8 of the membrane spring 7, preferably by means of a clutch release system which is not shown here, but an example of which is shown and described further below with reference to FIGS. 6 and 6a. In accordance with one embodiment of the present invention, the release force preferably takes place in the direction of Arrow A in FIG. 1a, i.e. towards the flywheel 2. Consequently, the membrane spring 7 can preferably tip around a support point 7b (see FIG. 1a) in the vicinity of the wire ring 36, so that the outside circumference 7a of the membrane spring 7 can be moved away from the flywheel 2.

The friction clutch 1 can also preferably have a release spring device, one example of which spring device is shown schematically in FIG. 1a as indicated by reference number 5a. Such a spring device 5a can preferably exert a force in the direction indicated by Arrow C on the thrust plate 5. As such, the thrust plate 5, the adjustment device 23 and the clearance sensor 13, including the sliding pin 17, the actuator lever 14 and the adapter sleeve 9, can simultaneously carry out the release process of the friction clutch 1.

The engagement process essentially takes place in the opposite direction. That is, to engage the clutch 1, force is preferably exerted on the flexible tabs 8 in a direction of Arrow B (see FIG. 1a), or force A can simply be released. If, during the engagement process, wear occurs to the friction linings 4, the position of the thrust plate 5 will typically be reset a slight distance toward the flywheel 2, preferably by the force of the membrane spring 7 with the interposition of the two rings 24 and 25. The distance will typically be by an amount of the wear of the friction linings 4. But, since the position of the clearance sensors 13 is preferably set in contact with the flywheel 2, when there is no wear of the friction linings 4, preferably by means of the heads 18 of the sliding pins 17, the membrane spring 7, by its force, can preferably effect a relative displacement between the thrust plate 5 and the sliding pins 17 with the adapter sleeves 9. In other words, the sliding pins 17 will remain in place, in contact with the flywheel 2, while the membrane spring 7 pushes pressure plate 5 to the left in FIGS. 1 and 1a, and, since the force of membrane spring 7 can preferably be a strong force, membrane spring 7 preferably overpowers the frictional engagement of the sliding pin 17 in the bearing 10. Thus, all of the actuator levers 14 therefore will now be spaced apart from their contact position on the ring 24 by the amount of the wear of the linings 4.

In other words, in accordance with one embodiment of the present invention, the actuator levers 14, which are preferably disposed in the recesses 33 of the ring 24, preferably lose their previous axial contact with the base 33b (see FIG. 3aa) of the recesses 33. Then, during the subsequent release process of the friction clutch 1, the radially outer portion 7a of the membrane spring 7 preferably moves away from the flywheel 2, and the tension springs 31 of the adjustment device 23 therefore cause a relative rotation of the two rings 24 and 25 against one another to move ring 24 back into axial engagement with the lever 14. Thus, it can essentially be guaranteed that the increased space between the thrust plate 5 and the actuator lever 14 in the axial direction, due to the wear of the friction linings 4 is once again filled up. Preferably, the axial filling occurs first, and then from the moment this space is filled up by the two rings 24 and 25, the thrust plate 5, together with the clearance sensors 13, can be lifted away from the flywheel 2, so that the clutch disc 3 can preferably be released.

During this release process, care should be taken that the spring force applied by the release device 5a, which release device 5a preferably acts on the thrust plate 5 in the direction indicated by the Arrow C, does not interfere with the relative rotation between the two rings 24 and 25 of the adjustment device 23. In other words, care should be .taken that the release device 5a, which acts on the pressure plate 5 in direction C, provides only a slight release force in the direction of arrow C so as not to overpower the force of spring 31, which spring 31 preferably causes the rings 24 and 25 to move and adjust for the wear of the friction linings 4, thereby enabling spring 31 to move rings 24 and 25 first, before further release of the pressure plate 5 from the flywheel 2.

In accordance with one embodiment of the present invention, the spring 31 preferably biases the springs 24 and 25 in the directions indicated by the Arrows H shown in FIGS. 3aa and 3bb.

Figure 2:
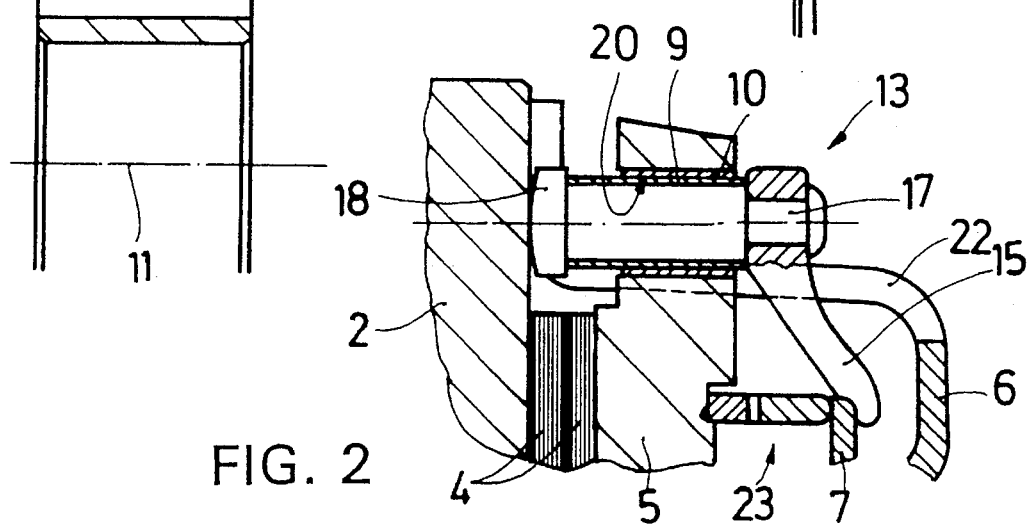
Figure 2A:
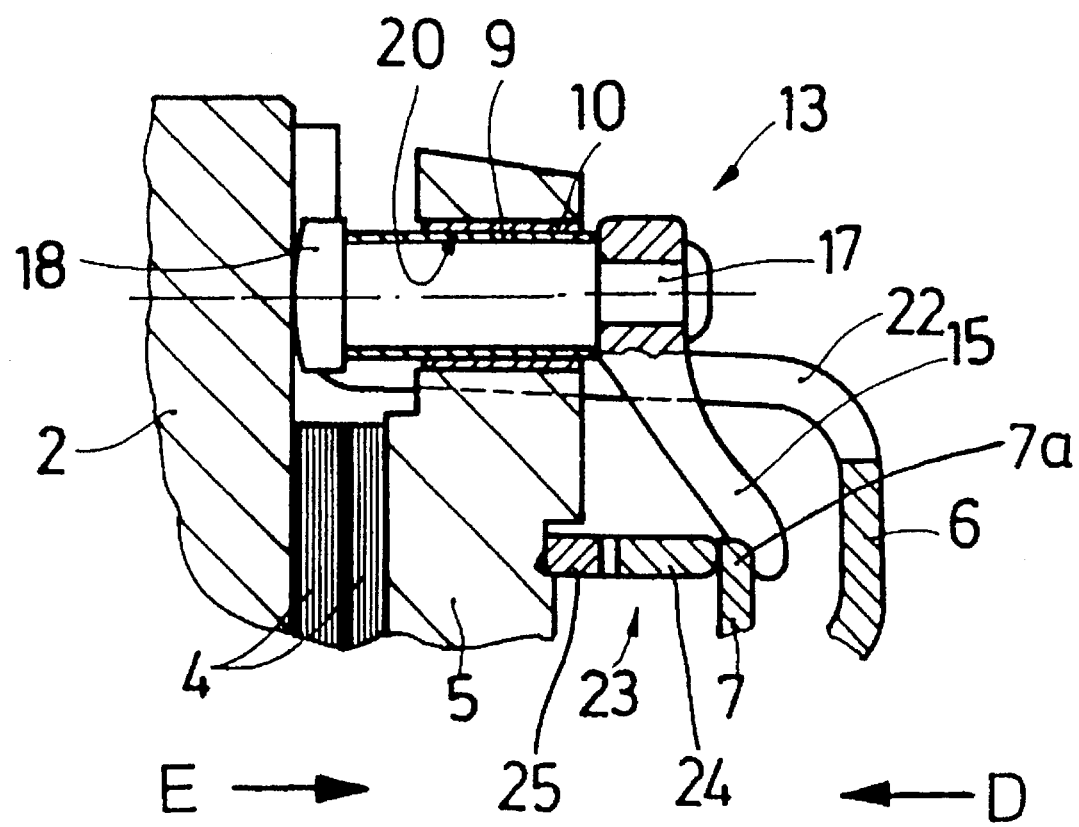
FIG. 2a shows substantially the same view as FIG. 2, but shows additional components.

An additional embodiment of the present invention is illustrated in FIGS. 2 and 2a, in which an actuator lever 15 of the clearance sensor 13 preferably does not act directly on one of the rings 24, 25 of the adjustment device 23, but instead acts on the radially outside edge 7a (see FIG. 2a) of the membrane spring 7. In accordance with this embodiment, the membrane spring 7 is preferably interposed between ring 24 and the actuator lever 15. The other elements of the embodiment shown in FIGS. 2 and 2a are essentially identical to those illustrated in FIGS. 1 and 1a. As a result of this special configuration, the clearance sensors 13, according to one embodiment of the present invention, can preferably simultaneously function as the mandatory releasing device for the thrust plate 5, in which case, when the membrane spring 7 is actuated to release, the membrane spring 7 preferably moves all the clearance sensors 13 with the sliding pins 17 into the release position.

In other words, and in accordance with the embodiment of the present invention shown in FIGS. 2 and 2a, a releasing device similar to the releasing device 5a as shown in FIG. 1a may not be necessary in that the membrane spring 7 can preferably act as a releasing device for the pressure plate 5. Since the membrane spring 7 preferably acts directly on the lever 15, when the membrane spring 7 is released and the outer portion 7a (see FIG. 2a) of the membrane spring 7 is moved in the direction indicated by Arrow E, the lever 15 can preferably move along with the membrane spring 7 to the right. Further, as the lever 15 moves to the right with the membrane spring 7, lever 15 can cause the pressure plate 5 to also move to the right and to disengage from the flywheel 2, preferably by means of the frictional connection between the sliding pin 17 and the bearing 10. Thus, the clearance sensors 13 can also function as the releasing device for the pressure plate 5 in the direction indicated by Arrow E.

In the event of an engagement process accompanied by wear of the friction linings 4, in accordance with the embodiment of the present invention as shown in FIGS. 2 and 2a, the magnitude of the wear will essentially appear as a gap between the radially outer portion 7a (see FIG. 2a) of the membrane spring 7 and the actuator lever 15. During the subsequent release process, that is, during the movement of the membrane spring 7 toward the actuator lever 15, preferably after a force has been applied to the tongues (not shown here) of the membrane spring 7 in the direction indicated by Arrow D, as a function of this wear, the two rings 24 and 25 of the adjustment device 23 are preferably correspondingly repositioned by the tension spring 31, preferably so that there is no longer any clearance between the thrust plate 5, the rings 24 and 25, the membrane spring 7 and the actuator lever 15.

Further, in accordance with one preferred embodiment of the present invention, the friction clutch shown in partial section in FIGS. 2 and 2a could be considered to be a "pushed" clutch, similar to the friction clutch 1 shown in FIGS. 1 and 1a. Thus, in FIGS. 2 and 2a, the releasing motion is preferably in the direction indicated by the Arrow D, and the engaging motion is preferably in the direction indicated by the Arrow E.

Figure 4:
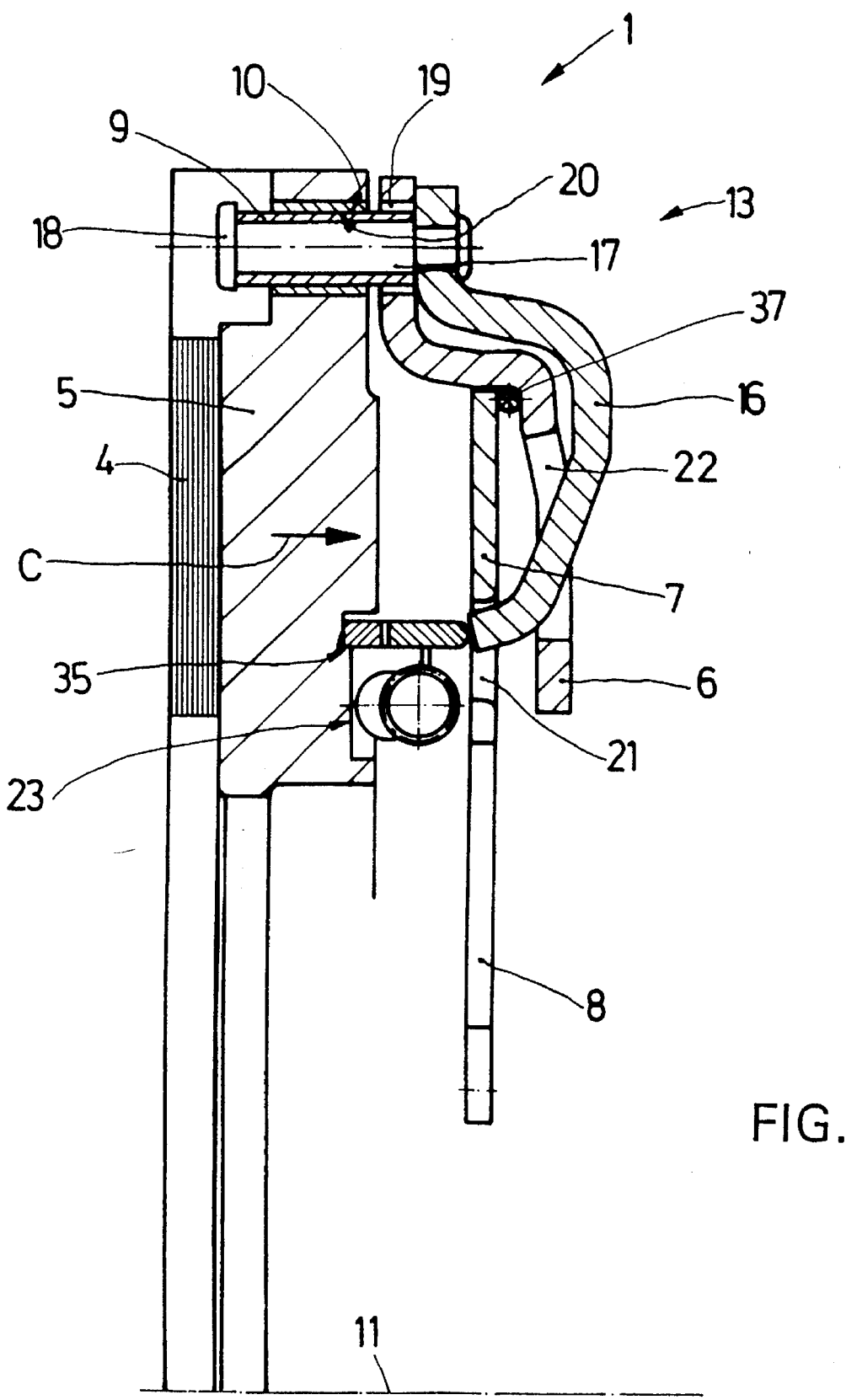
FIG. 4 shows the upper half of a longitudinal section through a friction clutch of the "pulled" type.

FIG. 4 illustrates one type of friction clutch 1 which typically can be considered to be a "pulled" friction clutch. On this "pulled" friction clutch, the membrane spring 7 is preferably supported in the vicinity of its outside circumference 7a (see FIG. 4a) preferably by means of a wire ring 37 on the clutch housing 6. The membrane spring 7, preferably by means of an intermediate diameter, can preferably actuate the thrust plate 5. The flexible tabs 8 preferably extend radially inward, and are preferably pulled away by means of a release system not shown here, but an example of which is shown in FIGS. 6 and 6a, during the release process preferably in the direction indicated by the Arrow C. On this "pulled" friction clutch 1, the axial stop can also be located between the clearance sensors 13 and an element which is integral to the housing 6, so that the individual actuator levers 16 come into contact with the outside of the clutch housing 6. Thus, essentially, the function of the heads 18 of the sliding pins 17 preferably is to connect the adapter sleeves 9 in the axial direction without fixed clamping to the clearance sensors 13. Further, in accordance with at least one embodiment of the present invention, the heads 18 of the sliding pins 17 preferably do not contact the flywheel (not shown) as compared to the other embodiments of the present invention shown in FIGS. 1 through 2a.

In the illustrated engaged state of the friction clutch 1, the membrane spring 7, by means of the rings 24 and 25 of the adjustment device 23, preferably applies pressure to the thrust plate 5, and thus clamps the friction linings 4 between the thrust plate and the flywheel (not shown here). In the engaged state, essentially all of the clearance sensors 13 are displaced toward the flywheel (not shown) so that the actuator levers 16 preferably come into contact with the housing 6, and the axial space between the radially inside ends 16a (see FIG. 4a) of the actuator levers 16 and the thrust plate 5 can be essentially completely filled up by the two rings 24 and 25. The two rings 24 and 25 can thereby be guided in a known manner on a guide diameter 35 of the thrust plate 5. In accordance with this embodiment of the present invention, since there is preferably no forced release, there can preferably also be a releasing device 5a (see FIG. 4a) which supplies a release force which preferably exerts pressure on the thrust plate 5 in the direction indicated by the Arrow C.

Each actuator lever 16 preferably runs from outside of the clutch housing 6, through corresponding openings 22 in the clutch housing 6, and through corresponding openings 21 in the membrane spring 7. The openings 22 can thereby also function to prevent the actuator levers 16 from twisting. By means of corresponding openings 19 in the clutch housing 6, preferably in the vicinity of the sliding pins 17, the clutch housing 6 essentially has no adverse effect on the axial displacement of the clearance sensors 13. In the event of an engagement process accompanied by wear, the thrust plate 5 is preferably moved closer to the flywheel (not shown here) by the force of the membrane spring 7, and, simultaneously, the clearance sensors 13 are preferably held essentially stationary by the clutch housing 6, and the thrust plate 5 can thus execute a relative motion with respect to the clearance sensors 13. The radially inward ends 16a (see FIG. 4a) of the actuator levers 16 can thereby be lifted from the corresponding ring, preferably ring 24 of the adjustment device 23, by the magnitude of the wear.

During the next engagement process, first there preferably is repeated equalization of the distance between the thrust plate 5 and the actuator levers 16, by means of relative rotation of the two rings 24 and 25 due to the force of the tension springs 31, and then the releasing process typically begins. In this case, care must also be taken that the force of the releasing device 5a (see FIG. 4a) essentially does not interfere with the axial movement during the rotation of the two rings 24 and 25. In other words, care should be taken to ensure that the releasing device 5a does not overpower the force of the spring 31 which moves the rings 24 and 25 with respect to one another.

Figure 4A:
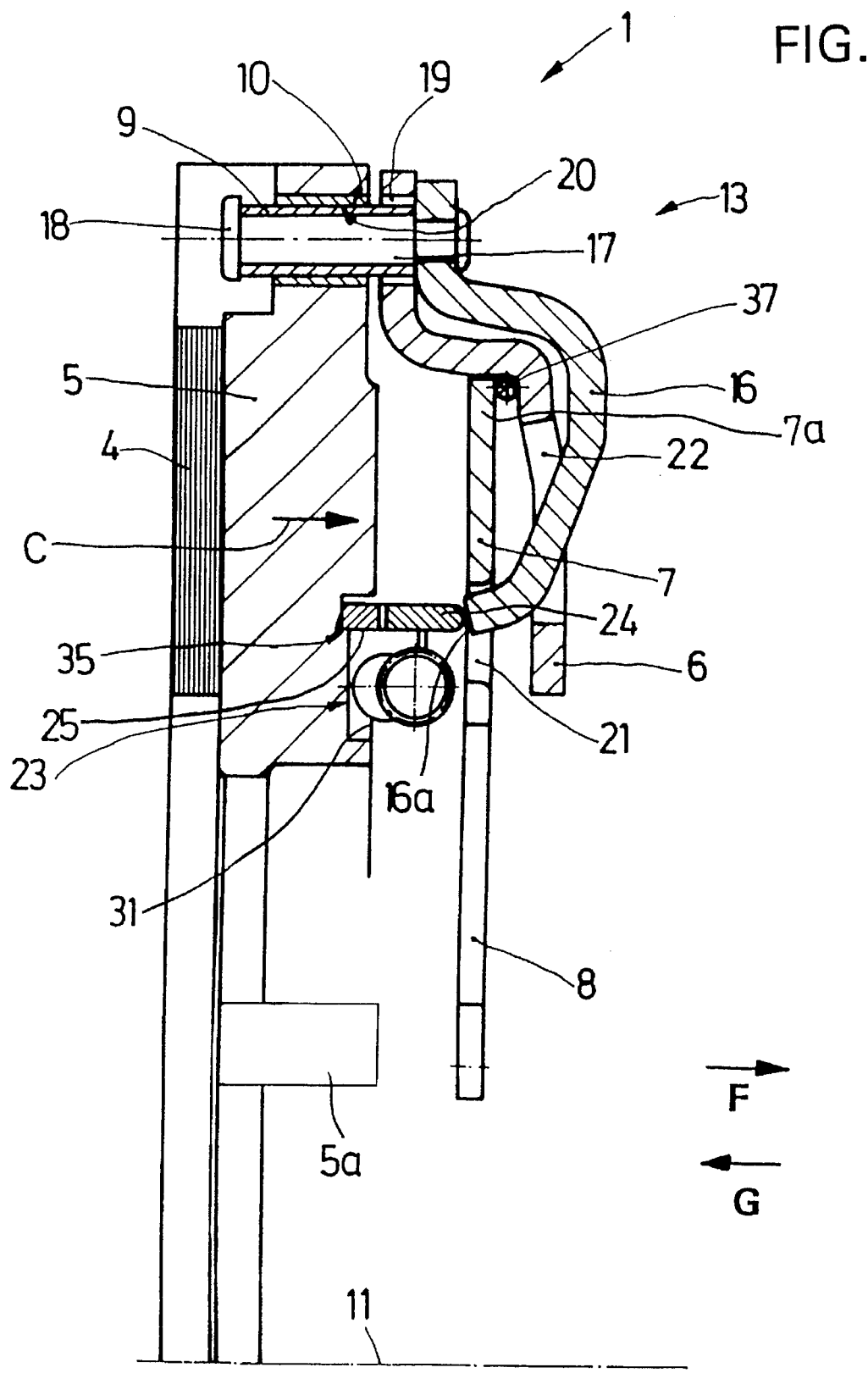
FIG. 4a shows substantially the same view as FIG. 4, but shows additional components.

In accordance with one embodiment of the invention as shown in FIG. 4a, the releasing force on the membrane spring 7 preferably takes place in the direction as indicated by arrow F. Oppositely, the engaging force will typically take place in the direction as indicated by arrow G.

FIG. 3b shows one particular embodiment of the partial surfaces 28 and 29 between the two rings 24 and 25. In the illustrated embodiment, the partial surfaces 28 and 29 can preferably comprise numerous individual partial pieces. Each of the partial pieces preferably extend in a stepped fashion and parallel to a plane perpendicular to the axis of rotation 11. As a result of this design, neither the spring device, in the form of the tension springs 31, nor the application force of the membrane spring 7 can cause a circumferentially-directed force component which could push both rings 24 and 25 in either direction of rotation. But, this design can also realize a not-altogether-continuous adjustment for wear, since first there must be wear which is somewhat greater than the height of the step 30. In practice, this height has been determined to be approximately 0.2 mm, for example. Of course, slight variations of this dimension may be possible, and the height of the step 30 should not be taken as limited to this value.

Further, the rings 24 and 25, as embodied in FIGS. 3b and 3bb, can preferably be open at an area on their circumference, and therefore can have a gap 34.

In accordance with one embodiment of the present invention as shown in FIG. 3bb, the rings 24 and 25 could have recesses 33 similar to those shown in FIGS. 3a and 3aa.

The purpose of the bushing 10 inserted into the thrust plate 5 preferably is to preserve the friction characteristics with respect to the adapter sleeve 9 over the life of the friction clutch 1. For this purpose, the bushing 10 can be made of brass, bronze, plastic or a composite material, for example. Of course, other materials may be appropriate.

Figure 5:
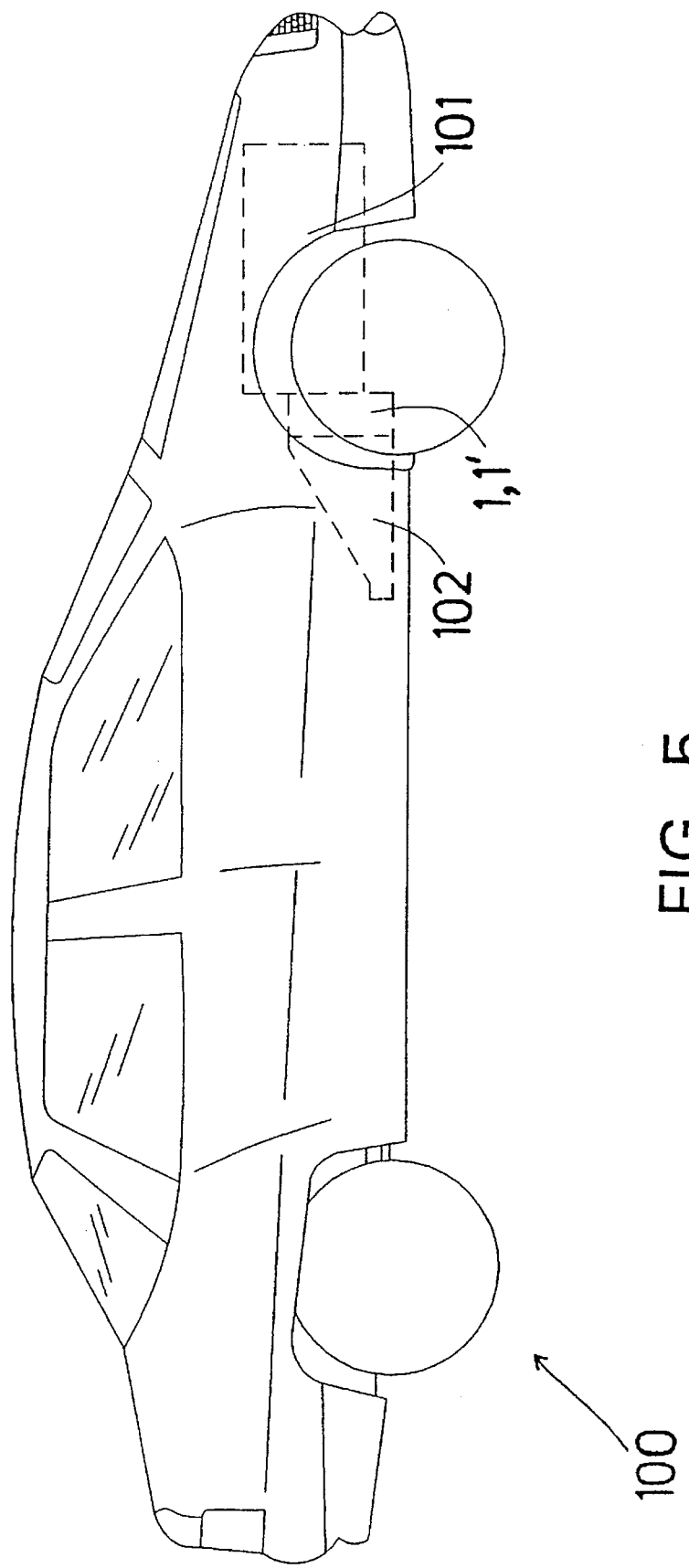
FIG. 5 shows a typical motor vehicle, which incorporates the present invention.

FIG. 5 shows what could be considered to be a typical automobile 100. Such an automobile could typically have an internal combustion engine 101 mounted in a forward portion thereof. The automobile could also typically include a drive shaft (not shown), and a manual transmission 102 for transmitting mechanical power to the wheels. Such an automobile 100 could also typically include the friction clutch 1, 1' (see FIGS. 6 and 6*a* described herebelow), for engaging the engine 101 with the transmission 102.

Figure 6:
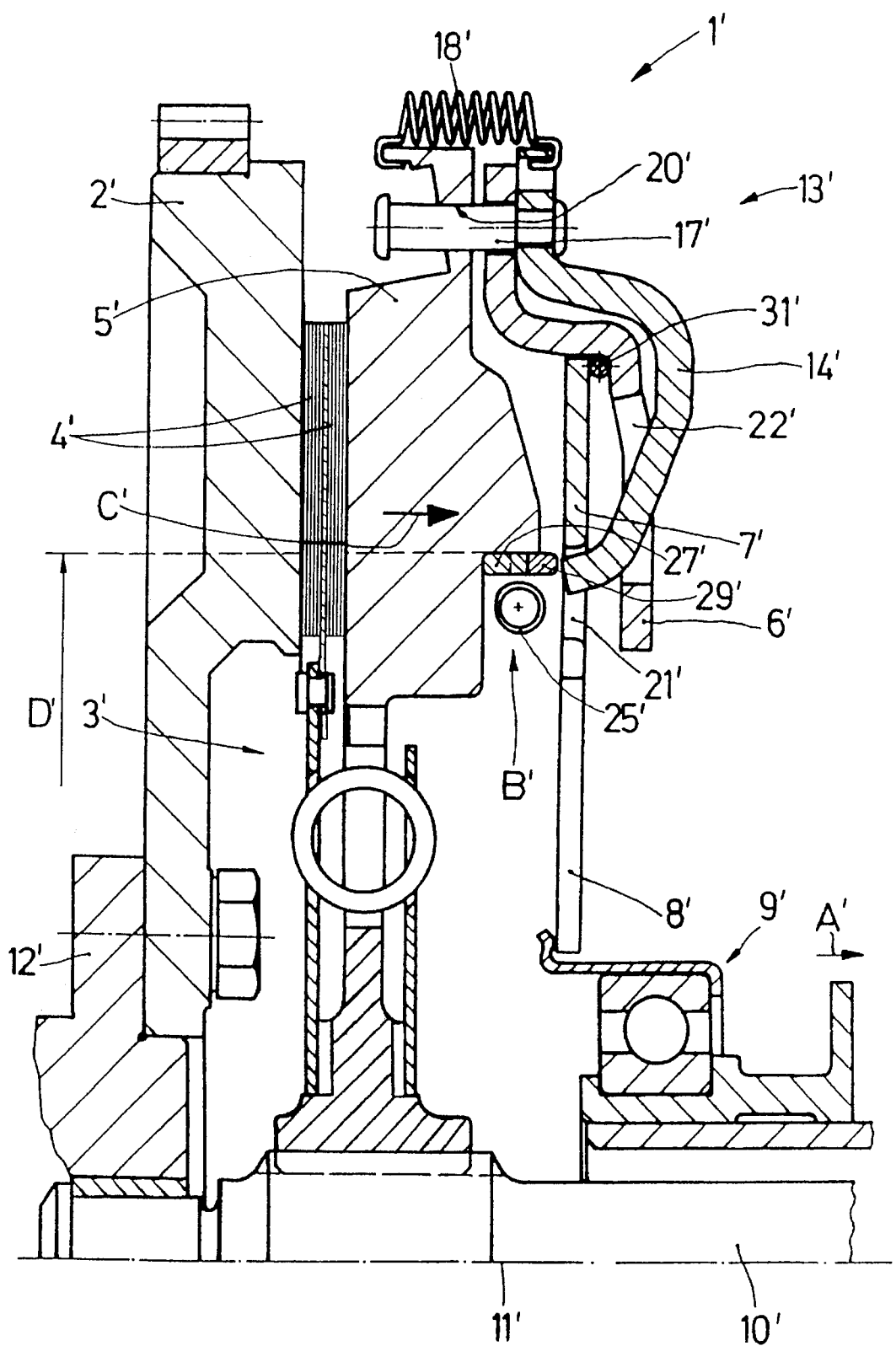
FIG. 6 shows an additional embodiment of the present invention, the view being of the upper half of an axial section through a complete friction clutch.
Figure 6A:
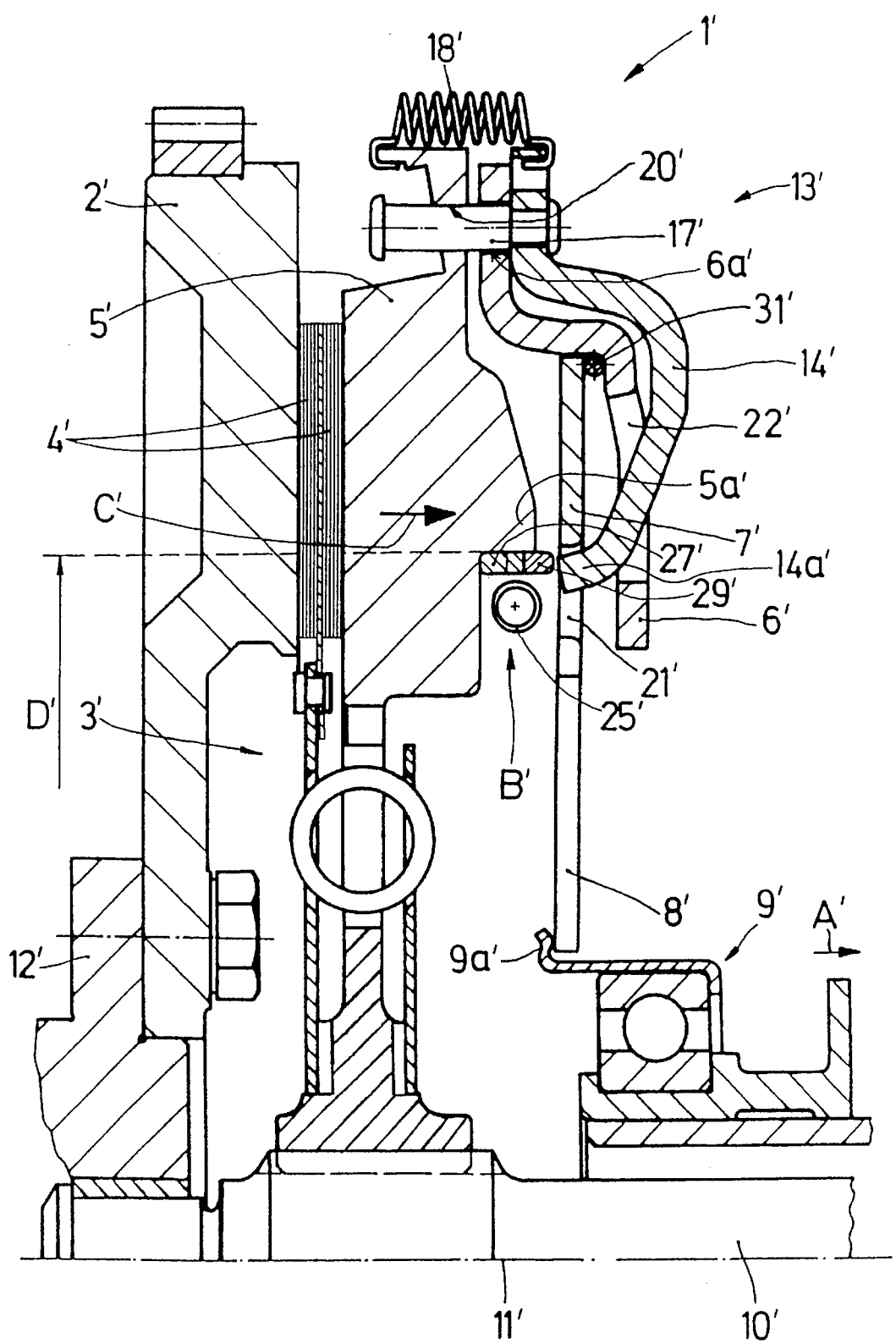
FIG. 6a shows substantially the same view as FIG. 6, but shows additional components.

FIGS. 6 and 6*a* show an alternative embodiment of the present invention which is similar to that shown in FIGS. 4 and 4*a*. It should be understood that the similar components of the embodiments of the present invention shown in FIGS. 1 through 4*a* could be considered to be interchangeable with similar components shown in FIGS. 6 through 8*aa*.

The friction clutch 1' shown in FIGS. 6 and 6*a* generally includes a flywheel 2', which flywheel 2' is preferably fastened to the crankshaft 12' of an internal combustion engine. The flywheel 2' preferably rotates together with the crankshaft 12', around the axis of rotation 11'. In conjunction with the flywheel 2' there is a clutch housing 6', which preferably encloses the clutch disc 3', the pressure plate 5' and the membrane spring 7'. The pressure plate 5' is preferably mounted in a manner not illustrated in any further detail but generally in a manner known in the art, on the clutch housing 6' so that it is preferably torsionally stationary, but can move axially. The orientation of the membrane spring 7' is the orientation preferably found in a "pulled" friction clutch or friction clutch under tension, whereby the outside diameter of the membrane spring 7' is preferably in contact with the clutch housing 6', preferably by means of a wire ring 31'. Further, a central area of the membrane spring 7' preferably exerts an axially-directed force on the pressure plate 5', to clamp the friction lining 4' of the clutch disc 3' between the pressure plate 5' and the flywheel 2', thereby engaging the clutch 1'. Thus, the clutch disc 3' is preferably mounted so that the clutch disc 3' is essentially torsionally stationary, but preferably axially movable on the transmission shaft 10'.

Figure 8A:
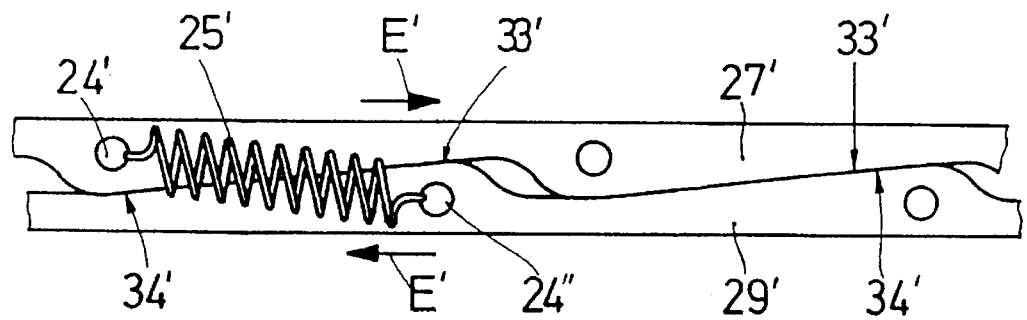
FIG. 8a is View "B'" of one embodiment of a ring configuration from radially inside.

In the disengaged position of the friction clutch 1', a biasing force is preferably transmitted from the membrane spring 7' to the pressure plate 5' by means of a ring element, which ring element is preferably radially guided on a guide diameter D' of the pressure plate 5'. The ring element is preferably comprised of two coaxial rings 27' and 29'. FIG. 8*a*, which shows View "B'" as indicated in FIG. 6, shows a radially inside view of the two rings 27' and 29'. If an adjustment is needed due to the wearing of the friction linings 4', the two rings 27' and 29' are preferably pulled toward one another, at least by a tension spring 25', in the circumferential direction with a force which preferably twists the two rings 27' and 29' in opposite directions as indicated by the Arrows E', thus preferably increasing the axial space occupied by the two rings 27' and 29'.

Referring back to FIG. 6, a releasing device 9' is shown, which releasing device 9' preferably reaches behind the flexible tabs 8' of the membrane spring 7', and which releasing device 9' is preferably moved in the direction of the Arrow A' to disengage the friction clutch 1'. When the friction clutch 1' is released or disengaged, corresponding to the movement A' of the releasing device 9' to the right, the membrane spring 7' is preferably tipped or pivoted with respect to the wire ring 31', and the clamping force on the friction linings 4' is released, and the clutch 1' is preferably disengaged. As a result of an aerodynamic force, or possibly a releasing force which preferably acts on the pressure plate 5' in the direction indicated by Arrow C' the pressure plate 5' is preferably held by means of the two rings 27' and 29' in contact with the central area of the membrane spring 7', and the ring 29' is preferably simultaneously in contact with the sensing lever 14' of a clearance sensor 13'. This aerodynamic force or releasing force which preferably acts on the pressure plate in the direction indicated by Arrow C', could possibly come about as a result of the absence of the force of the membrane spring 7'. The other ring 27', viewed in the axial direction, is preferably in contact with a surrounding or circular portion of the pressure plate 5'. Both rings 27' and 29' are preferably fixed in the radial direction by the guide diameter D' of the pressure plate 5'.

During the disengagement process, there can preferably be several clearance sensors 13' distributed about the circumference of the clutch housing 6', or possibly distributed over the circumference of the pressure plate 5'. During the disengagement process, the clearance sensors 13' preferably move to the right along with the pressure plate 5'. Each sensing lever 14' preferably has a sliding bolt 17', the axis of which sliding bolt 17' preferably extends in a parallel direction with respect to the axis of rotation 11'. The sliding bolt 17' preferably extends through the pressure plate 5' in a hole 20'. In this hole 20', the bolt 17' is preferably fixed during this process by jamming, or possibly by tilting, preferably to frictionally maintain the bolt 17' in a substantially fixed position during normal operation. The jamming of the sliding bolt 17' is preferably assisted by means of respective tension springs 18'. The sliding bolt 17' thereby preferably extends with sufficient play through a corresponding opening 6*a*' (see FIG. 6*a*) in the clutch housing 6'. The tension springs 18' can preferably be disposed to "twist" the clutch housing 6' relative to the pressure plate 5' to essentially misalign holes 20' and 6*a*' (see FIG. 6*a*). The sensing lever 14' also preferably runs radially inside the sliding bolt 17', and through the clutch housing 6' in an opening 22'. Thus, the bolt 17' can conceivably have a slot or opening through which the sensing lever 14' can extend. The sensing lever 14' also preferably extends through the membrane spring 7' by means of an opening 21'. The end 14*a*' (see FIG. 6*a*) of the sensing lever 14' is preferably in direct contact with the ring 29'.

The clearance sensors 13' discussed above may, in an alternative embodiment of the present invention, be in the form of self-adjusting collars or stop means labelled 52 and as shown in FIG. 4 of U.S. Pat. No. 4,207,972, and as discussed in column 3 of U.S. Pat. No. 4,207,972.

In one preferred embodiment, preferably before any wear of the friction lining 4' has occurred, disengagement of the clutch 1' is begun preferably by moving the releasing device 9' in the direction shown by Arrow A' in FIG. 6 (i.e. to the right). A flange or projection 9*a*' (see FIG. 6*a*) preferably causes the membrane spring 7' to pivot about the wire spring 31', thus the pressure previously exerted on the pressure plate 5' by means of the membrane spring 7', is preferably released, allowing the pressure plate 5' to also move to the right in accordance with Arrow C'. As discussed previously, a releasing force can preferably cause the pressure plate 5' to move to the right, the releasing force possibly being the result of the absence of the force of the membrane spring 7' on the pressure plate 5'. Thus, as the membrane spring 7' moves to the right, the pressure on the pressure plate 5' is preferably lessened and, the membrane spring 7' may even lose contact with the ring 29' at some point during the disengagement process.

The sensing lever 14' can preferably be positioned during assembly, so that the spring 18', and the sliding bolt 17' preferably hold the sensing lever 14' in a predetermined position with respect to the pressure plate 5' and the two rings 27' and 29'. Further, also during assembly, the membrane spring 7' can preferably be aligned so that the membrane spring 7' is in a position approximately perpendicular to the axis of rotation 11'. Both of these positions of the membrane spring 7' and the sensing lever 14' would preferably correspond to the "engaged" position of the clutch 1'. The sensing lever 14' can then be positioned so that the end 14a' (see FIG. 6a) of the sensing lever 14' would preferably be in contact with ring 29', and, as discussed above, the sliding bolt 17' and the spring 18' can then be used to hold this position of the sensing lever 14'.

Thus, due to the original positioning of the membrane spring 7' and the sensing lever 14' during assembly, during the disengagement process there is preferably at least some contact between ring 29' and the membrane spring 7', and also between the ring 29' and the sensing lever 14'.

During the subsequent engagement process, wear can occur to the friction lining 4' as a result of the high stresses involved, so that the membrane spring 7' brings the pressure plate 5' into a position closer to the flywheel 2', most likely due to the thinner condition of the friction lining 4'. Since the pressure plate 5' is in a position closer to the flywheel 2', the sensing lever 14' can essentially not execute the corresponding differential movement as it typically does when there is no wear of the friction lining 4', since the sensing lever 14' preferably comes in contact with the outside of the clutch housing 6' in the vicinity of the sliding bolt 17', as shown in FIGS. 6 and 6a. During the engagement process, therefore, a gap can be formed between the ring 29' and the radially inner area or end 14a' (see FIG. 6a) of the sensing lever 14'. The two rings 27' and 29', however, due to the application of an axial force preferably by the membrane spring 7' under these conditions, or during engagement of the clutch 1', are essentially unable to achieve any compensation for wear. Essentially only during the subsequent disengagement process, (i.e. when the clamping force of the membrane spring 7' is removed or at least lessened), and essentially only the relatively low aerodynamic force or releasing force is active as indicated by Arrow C' between the pressure plate 5' and the membrane spring 7', can the gap between the ring 29' and the sensing lever 14' be adjusted. Thus, the spring device, which spring device can have at least one tension spring 25', preferably twists the two rings 27' and 29' as shown in the direction of Arrows E' (see FIG. 8a), so that the partial surfaces 33' and 34', which are preferably oblique in relation to a plane perpendicular to the axis of rotation 11', ascend on one another, thereby preferably increasing the overall width of the ring element. Thus, the sensing lever 14' may serve to limit the ability of the rings 27' and 29' to expand.

FIG. 8a shows that the tension spring 25' is preferably suspended with one end of the tension spring 25' in an opening 24' of the one ring 27', and with its other end in an opening 24" of the other ring 29' The two rings 27' 29', can thus be twisted until the gap between the ring 29' and the sensing lever 14' is preferably closed or filled. Thus, the membrane spring 7' is preferably again in its original position in relation to the clutch housing 6', and this position can preferably be maintained throughout the entire wear life of the friction lining 4'. Thus the force of the membrane spring 7' is kept essentially constant over the entire life of the unit.

Thus, in summary, the friction linings 4' typically wear and thus become thinner with use. In one preferred embodiment, when the clutch 1' is being engaged, the membrane spring 7' preferably moves the pressure plate 5' towards the flywheel 2' and since the friction linings 4' are thinner due to wear, the membrane spring 7' will most likely need to travel a greater arc of travel than was originally the case (i.e. when there was no wear of the friction linings 4') in order to force the pressure plate 5' against the flywheel 2'. The sensing lever 14', which sensing lever 14' is preferably normally in contact with the pressure plate 5' by means of ring 29' when there is no wear of the friction linings 4', due to the predetermined position of the sensing lever 14' as discussed above, now will most likely lose contact with the ring 29', and a gap may be formed between the sensing lever 14' and the ring 29' when the membrane spring 7' pushes the ring 29' towards the flywheel 2'.

Therefore, the adjustment of the rings 27' and 29' preferably will take place during the next disengagement of the clutch 1', or when the pressure of the membrane spring 7' is removed, or at least lessened, from the two rings 27' and 29'. When the pressure of the membrane spring 7' is removed from the rings 27' and 29', the gap between the sensing lever 14' and the ring 29' is "sensed" and the spring 25' preferably pulls the two rings 27' and 29' circumferentially along one another so that the axial space occupied by the two rings 27' and 29' is increased, thus preferably filling the gap. The membrane spring 7' can preferably resume the original position preferably perpendicular to the axis of rotation 11', as discussed above.

Figure 7:
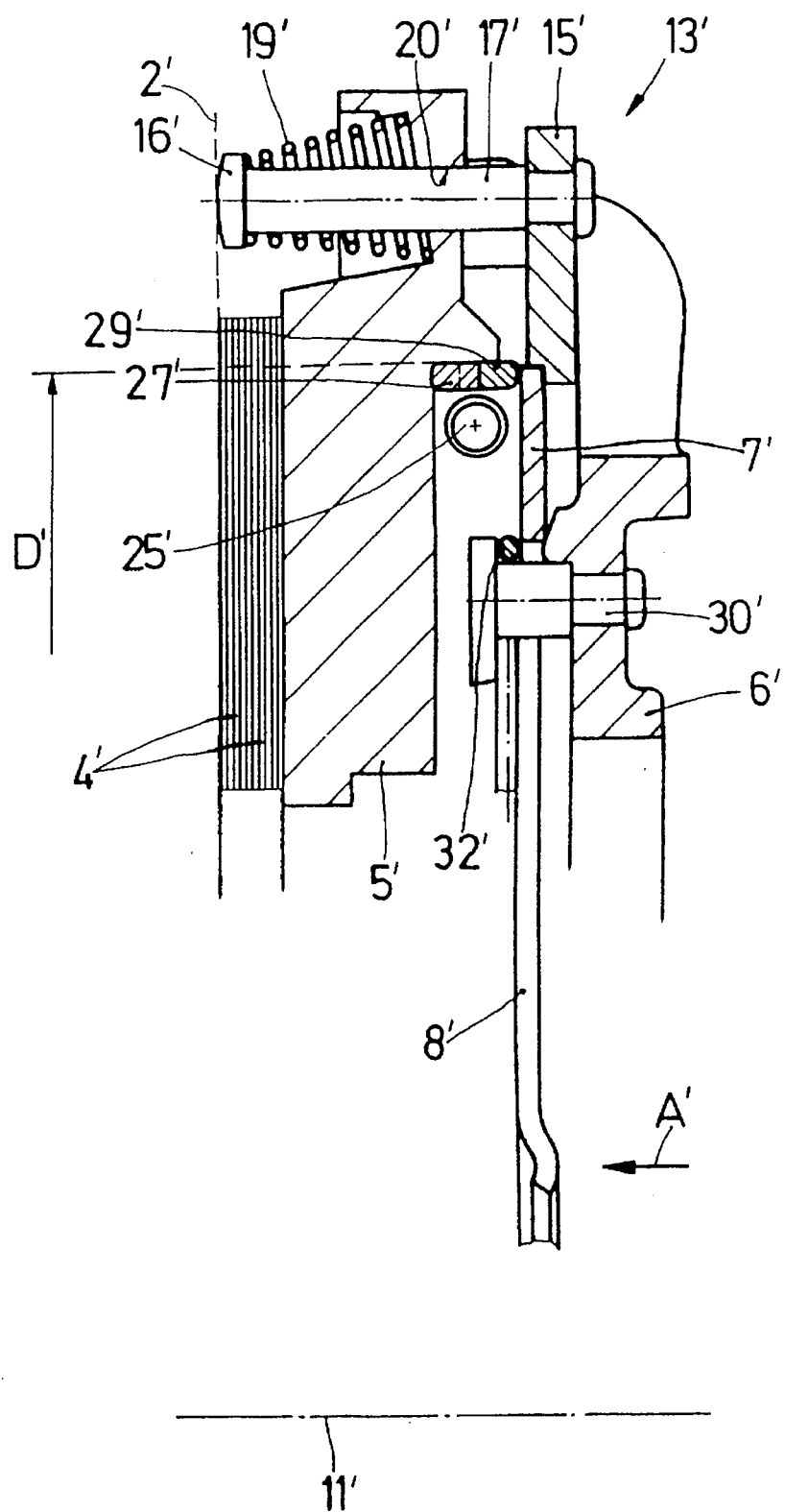
FIG. 7 shows the upper half of a similar structure as shown in FIGS. 6 and 6a, in partial section.
Figure 7A:
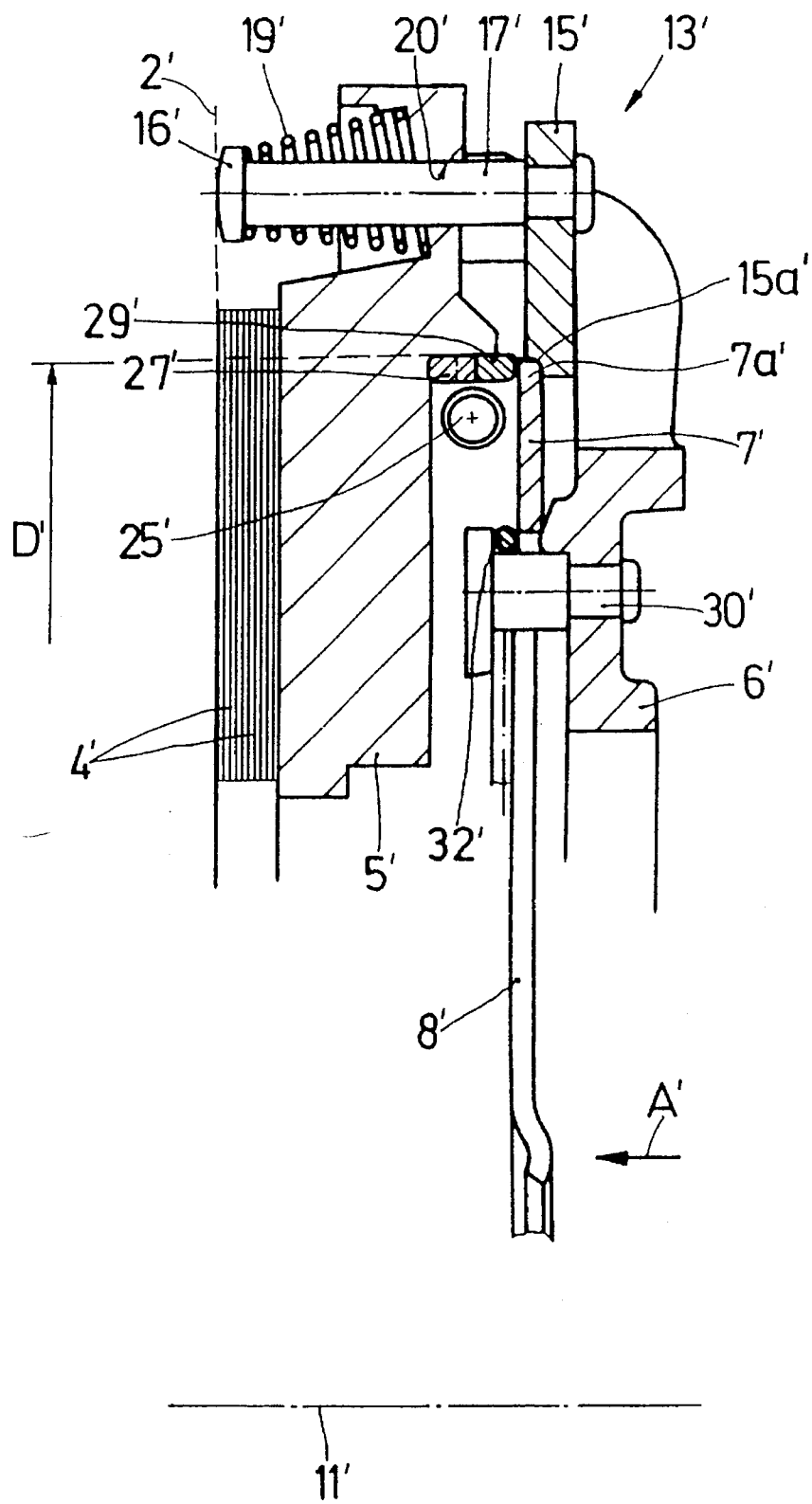
FIG. 7a shows substantially the same view as FIG. 7, but shows additional components.

FIGS. 7 and 7a show a configuration which differs somewhat from the configuration illustrated in FIGS. 6 and 6a. The differences relate to the fact that the friction clutch is a "pushed clutch" or a "clutch operating under compression", in which the membrane spring 7' preferably acts by means of the outside diameter 7a' (see FIG. 7a), on the pressure plate 5'. Further, the membrane spring 7' is preferably fixed in its central diameter to the clutch housing 6', preferably by means of spacer bolts 30', and at least one wire ring 32', thereby preferably forming a trigger or sweep circuit.

The clearance sensor 13' is also designed differently in the embodiment illustrated in FIGS. 7 and 7a. In this case, the activation levers 15' are preferably in contact on the side of the membrane spring 7' facing away from the pressure plate 5', and the corresponding sliding bolts 17' extend through the hole 20' in the pressure plate 5', so that the bolts 17' preferably come in contact with a corresponding head 16' on the flywheel 2'. A compression spring 19' is thereby preferably located between the head 16' and the pressure plate 5' such that the sliding bolt 17' is preferably jammed in the hole 20' and after wear has occurred on the friction lining 4', a relative axial movement can essentially only take place if the head 16' comes in contact with the flywheel 2' before the pressure plate 5' has assumed its engaged position.

The operation of the clutch shown in FIGS. 7 and 7a is essentially as follows. To initiate a disengagement process, a force in the direction indicated by Arrow A' is preferably exerted on the flexible tabs 8' of the membrane spring 7' by means of the release mechanism (not shown in FIGS. 7 and 7a). The membrane spring 7' thereby preferably pivots around the clamping point on the clutch housing 6', so that the outside diameter 7a' (see FIG. 7a) of the membrane spring 7' is preferably moved away (i.e. to the right) from the flywheel 2'. The membrane spring 7' thereby can forcibly release the pressure plate 5', preferably by means of the sensing lever 15' and the sliding bolts 17', which bolts 17' are preferably jammed in the hole 20'. The two rings 27' and 29' are preferably held by the spring device with the tension springs 25' essentially in continuous contact, on one hand with the pressure plate 5' and on the other hand with the membrane spring 7'. During the subsequent engagement process, and with the corresponding wear of the friction lining 4', the pressure plate 5' is typically brought by the force of the membrane spring 7', with the interposition of the two rings 27' and 29', into the new position closer to the flywheel 2'. The clearance sensors 13' with the activation levers 15' are essentially unable to follow this movement, since before that point, the heads 16' of the sliding bolts 17' come into contact preferably with the flywheel 2', so that a gap can be formed between the outside diameter 7a' (see FIG. 7a) of the membrane spring 7', and the radially inner areas 15a' (see FIG. 7a) of the activation levers 15'. The gap mentioned immediately hereinabove is typically formed as a result of the previous wear of the friction lining 4'.

During the next disengagement process, the membrane spring 7' preferably travels the wear distance toward the activation levers 15', possibly without disengagement from the pressure plate 5' in the wear area, or possibly near the radially inner areas 15a' (see FIG. 7a) of the activation levers 15'. The two rings 27' and 29' are thus able, preferably by means of the tension springs 25', to execute a mutual relative movement as shown by Arrows E' in FIG. 8a, so that the amount of wear which was produced during the preceding engagement process is preferably compensated by the axial expansion or spreading of the two rings 27' and 29'. The result is the relative displacement of the pressure plate 5' in relation to the membrane spring 7'.

With regard to the embodiments illustrated and described with respect to FIGS. 6 and 6a, and 7 and 7a, the adjustment, which is preferably accomplished by the movement of the two rings 27' and 29' may, in an alternative embodiment, occur due to a particular relationship between the strengths of membrane spring 7' and spring 25'. Thus, during a disengagement of the clutch 1', the pressure of membrane spring 7' is preferably lessened preferably by the motion of the releasing device 9' to the right, thus the spring 25' can preferably overpower the membrane spring 7' and preferably cause the rings 27' and 29' to adjust and become axially wider, until the gap closed between the sensing lever 14' and the ring 29'.

With regard to the embodiments illustrated and described with respect to FIGS. 6 and 6a, and 7 and 7a, the adjustment, which is preferably accomplished by the movement of the two rings 27' and 29' may in an additional alternative embodiment, occur due to a particular relationship between the strengths of springs 25' and 18' (FIGS. 6 and 6a), or due to a relationship between between the strengths of springs 25' and 19' (FIGS. 7 and 7a). Thus, during a disengagement of the clutch 1', the pressure of spring 18' (FIGS. 6 and 6a) or spring 19' (FIGS. 7 and 7a), may be lessened so that spring 25' can overpower spring 18' (FIGS. 6 and 6a) or 19' (FIGS. 7 and 7a), and thus adjust the two rings 27' and 29' to fill the gap formed due to wear of the friction linings 4'. In this embodiment, it is possible that the adjustment of the rings 27' and 29' could occur without a gap actually forming between sensing lever 14' (FIGS. 6 and 6a) or sensing lever 15' (FIGS. 7 and 7a) and ring 29'.

Figure 8B:
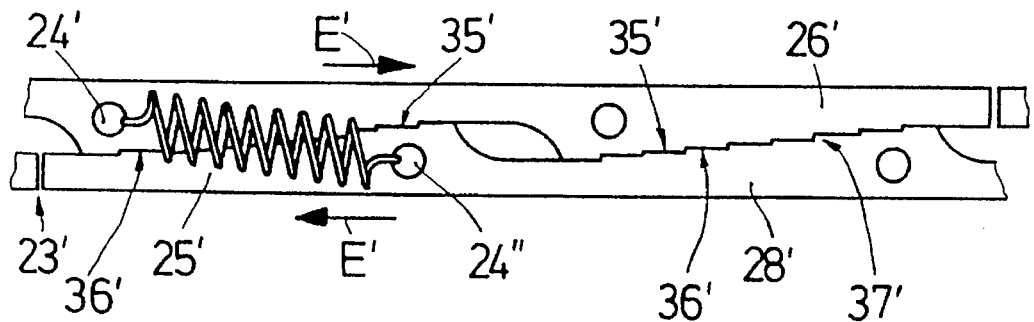
FIG. 8b is View "B'" of an additional embodiment of a ring configuration from radially inside.
Figure 8C:
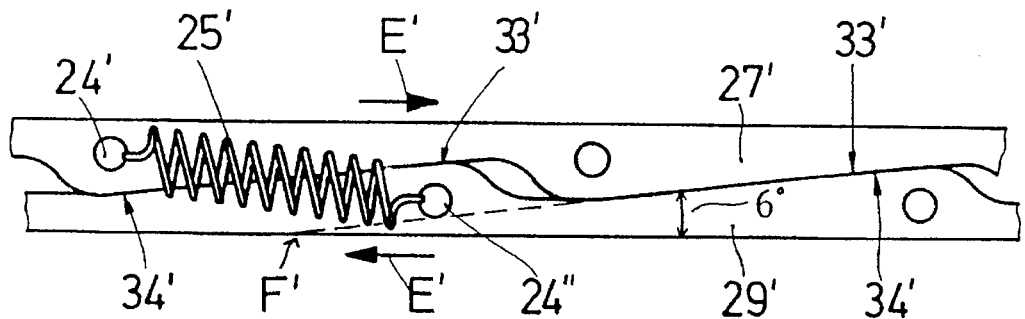

FIGS. 8a and 8b show two different embodiments of the ring element. As shown in FIG. 8a, and as indicated above, the rings 27' and 29' can preferably have partial surfaces 33' and 34' respectively in their areas facing one another, which surfaces 33' and 34' are preferably oblique or angled on the circumference, preferably in relation to a plane perpendicular to the axis of rotation 11'. When the force applied between the membrane spring 7' and the pressure plate 5' is removed, the two rings 27' and 29', as a result of the force of the tension springs 25', can be twisted in opposite directions with respect to one another, as indicated by the Arrows E', such that the partial surfaces 33' and 34' ascend over one another and the two rings thus occupy a greater axial space corresponding to the amount of wear experienced.

As shown in FIG. 8aa, the surfaces 33' and 34' can each be angled by about 6° with respect to point F', but are not to be taken as limited to this angle.

FIG. 8b illustrates an additional embodiment of the ring element in which the rings 26' and 28' are preferably equipped in the areas facing one another with surfaces 35' and 36' respectively, which surfaces 35' and 36' each preferably run parallel to a plane perpendicular through the axis of rotation 11', and which surfaces 35' and 36' can preferably have individual matching steps to form an oblique surface, whereby from one individual section of the surfaces 35' and 36' to the next, there preferably is an axial shoulder 37'. With this embodiment of the ring element, the oscillations produced by the crankshaft of the internal combustion engine are typically transmitted into the entire clutch 1', so that when there is wear of the friction lining 4' which is greater than the shoulders 37', these vibrations can typically make possible a relative motion of the two rings 26' and 28' toward one another in the direction indicated by Arrows E', preferably when the friction clutch 1' is disengaged. The large axial force between the membrane spring 7' and the pressure plate 5' is also essentially eliminated.

In this case, the rings 26' and 28' are preferably not closed around the circumference, as shown by gap 23' in FIG. 8b. The rings 26' and 28' are thus typically easy to manufacture. The preferably pre-bent rings 26' and 28' can thus preferably be pressed easily against the guide diameter D' of the pressure plate 5'.

Further, as discussed with regard to FIG. 8a, the tension spring 25' is preferably suspended with one end of the tension spring 25' in an opening 24' of the one ring 26', and with its other end in an opening 24" of the other ring 28'.

In an alternative embodiment of the ring element (not shown), the two rings can be configured in a similar manner to the rings 26' and 28' shown in FIG. 8b. In this embodiment, however, the individual sections of the surfaces 35' and 36' are preferably angled upwards towards the next respective shoulder 37' of the next individual section. In this embodiment, the angling of the individual sections of the surfaces 35' and 36' may prevent slippage of the two rings 26' and 28' in a direction opposite from the Arrows E' shown in FIG. 8b.

One particularly advantageous feature of the present invention is that the ring element can be manufactured as a separate component. Thus, no complicated machining of the surface of the pressure plate 5' which would be in contact with the ring element is necessary. In essence, essentially all that' is needed in order to fit the ring element onto the pressure plate 5' is a lip or flange 5a' (see FIG. 6a), preferably having the diameter D'. Thus, the manufacturing process of the ring element and the pressure plate 5' can be simplified, and also the costs of manufacture can preferably be reduced.

One feature of the invention resides broadly in the motor vehicle friction clutch with automatic adjustment for wear for the pressure plate, which is fastened with the interposition of a clutch disc with friction linings to a flywheel, and together with the latter forms an axis of rotation, including a thrust plate located non-rotationally but axially movably in a clutch housing, a membrane spring inserted under prestress between the thrust plate and the clutch housing, which membrane spring is braced in the vicinity of its outside circumference and in an area which has a smaller diameter both on the clutch housing and also by contact against the thrust plate, whereby the contact takes place with the interposition of an adjustment device which makes possible an axial displacement of the thrust plate away from the membrane spring as a function of the wear of the friction linings of the clutch disc, characterized by the fact that there are one or more clearance sensors 13 distributed around the circumference of the pressure plate, each of which acts by means of an actuator lever 14, 15, 16 which points radially inward directly or indirectly on a component of the adjustment device 23, that each clearance sensor 13 is mounted so that it can be moved axially by means of a sliding pin 17 in a hole 20 oriented parallel to the axis of rotation 11 in the thrust plate 5 and can be held in place by means of friction, in that an adapter sleeve 9 is located on the sliding pin 17 and is in frictional contact under radial prestress in the hole 20, each clearance sensor 13 has an axial stop which is integral with the housing, and which limits its motion with respect to the flywheel, and the adjustment device 23 penetrates into the enlarged space between the clearance sensor and the thrust plate during the disengagement process which follows the occurrence of the wear.

Another feature of the invention resides broadly in the motor vehicle friction clutch characterized by the fact that the sliding bolt 17 is permanently connected to the actuator lever 14, 15, 16 on the side of the thrust plate 5 which faces away from the flywheel 2.

Yet another feature of the invention resides broadly in the motor vehicle friction clutch characterized by the fact that each clearance sensor 13 is fixed and secured against rotation in relation to the opening 20 in the thrust plate 5.

Still another feature of the invention resides broadly in the motor vehicle friction clutch characterized by the fact that the actuator levers 14, 16 are in direct contact with the adjustment device 23 and a force is exerted on the thrust plate 5 by a release spring in the release direction.

A further feature of the invention resides broadly in the motor vehicle friction clutch characterized by the fact that the actuator levers 15 are in contact with the adjustment device 23 with the interposition of the membrane spring 7.

Another feature of the invention resides broadly in the motor vehicle friction clutch characterized by the fact that the friction clutch is designed as a pushed clutch.

Yet another feature of the invention resides broadly in the motor vehicle friction clutch characterized by the fact that the clutch housing 6 has an essentially cup-shaped portion which has openings for the passage of the actuator levers 14, 15 of the clearance sensors 13, which simultaneously prevent rotation of the actuator levers 14, 15.

Still another feature of the invention resides broadly in the motor vehicle friction clutch characterized by the fact that the friction clutch is designed as a pulled clutch.

A further feature of the invention resides broadly in the motor vehicle friction clutch characterized by the fact that each actuator lever 16 runs on the outside of the clutch housing 6 and extends through an opening 22 of the clutch housing 6 to the membrane spring 7, or through an opening 21 in the membrane spring 7 to the adjustment device 23, and is secured against rotation by the opening 23.

Another feature of the invention resides broadly in the motor vehicle friction clutch characterized by the fact that there are measures to increase the friction between the adapter sleeve 9 and the hole 20.

Yet another feature of the invention resides broadly in the motor vehicle friction clutch characterized by the fact that there are measures to prevent rust between the adapter sleeve 9 and the hole 20 bushing 10.

Still another feature of the invention resides broadly in the motor vehicle friction clutch characterized by the fact that the adjustment device 23 consists of two rings 24, 25 located axially one behind the other and which are guided on a guide diameter 35 of the thrust plate 5 concentrically to the axis of rotation 11, one of which is axially supported on the thrust plate 5 and one on the membrane spring 7, and both are supported in the areas facing one another by means of partial surfaces 26, 27; 28, 29 which have one or more sloped portions circumferentially, and whereby there is a spring device 31 which braces the two rings with respect to one another, and when wear occurs, rotates the two rings opposite to one another to increase the axial space between them.

A further feature of the invention resides broadly in the motor vehicle friction clutch characterized by the fact that the partial surfaces 26, 27 of the two rings 24, 25 each run continuously as a function of the specified slope.

Another feature of the invention resides broadly in the motor vehicle friction clutch characterized by the fact that the partial surfaces 28, 29 of the two rings 24, 25 consist of individual partial pieces, each of which runs in steps parallel to a plane which is perpendicular to the axis of rotation 11, each of which is provided with an axial step 30.

Yet another feature of the invention resides broadly in the motor vehicle friction clutch characterized by the fact that the spring device consists of at least one tension spring 31 which runs essentially tangentially and on the inside of the two rings 24, 25; 26, 27 and which is suspended by one end in an opening 32 of the one ring and by the other end in an opening 32 of the other ring.

Still another feature of the invention resides broadly in the motor vehicle friction clutch characterized by the fact that the two rings 24, 25; 26, 27 are manufactured from sheet metal strips.

A further feature of the invention resides broadly in the motor vehicle friction clutch characterized by the fact that the two rings 24, 25; 26, 27 are closed on the circumference.

Another feature of the invention resides broadly in the motor vehicle friction clutch characterized by the fact that the two rings 24, 25; 26, 27 are open on the circumference gap 34.

Types of clutch assemblies which have wear sensors or adjustment mechanisms for detecting and adjusting for the wear of the friction linings of a clutch may be disclosed by the following U.S. Pat. Nos. 4,191,285 to Thelander et al. on Mar. 4, 1980, entitled "Wear Compensator for Belleville Spring Clutch"; 5,238,093 to Campbell on Aug. 24, 1993, entitled "Wear Indicator for Adjustable Clutch"; 4,953,680 to Flotow on Sep. 4, 1990, entitled "Clutch Adjuster"; 4,549,643 to Flotow et al. on Oct. 29, 1985, entitled "Self Adjusting Device for a Friction Clutch"; 4,310,086 to Mochida on Jan. 12, 1982, entitled "Automatic Adjusting Device for a Clutch Operating Mechanism"; and 4,285,424 to Sink et al. on Aug. 25, 1981, entitled "Locking Device for a Friction Type Clutch".

Types of manual transmissions in which the present invention may be incorporated may be disclosed by the following U.S. Pat. Nos. 5,036,721 to Gugin on Aug. 6, 1991, entitled "Shift Control Mechanism for a Manual Transmission"; 4,222,283 to Nagy on Sep. 16, 1980, entitled "Manual Transmission Lubrication System"; 3,858,460 to Porter et al. on Jan. 7, 1975, entitled "Four Speed Manual Transmission and Control"; and 5,269,400 to Fogelberg on Dec. 14, 1993, entitled "Transmission Synchronizer".

Types of clutch assemblies in which the present invention may be incorporated may be disclosed by the following U.S. Pat. Nos. 4,635,780 to Wiggen on Jan. 13, 1987, entitled "Clutch Disc for a Motor Vehicle Friction Clutch"; 4,684, 007 to Maucher on Aug. 4, 1987, entitled "Clutch Plate"; 4,433,771 to Caray on Feb. 28, 1984, entitled "Torsion Damping Device for a Clutch Plate"; and 4,099,604 to Higgerson on Jul. 11, 1978, entitled "Friction Clutch with Integral Adjuster".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents recited herein, are hereby incorporated by reference as if set forth in their entirety herein.

The corresponding foreign patent publication applications, namely, Federal Republic of Germany Patent Application No. P 43 37 613.4, filed on Nov. 4, 1993, having inventors Achim Link, Reinhold Weidinger, Heiko Schulz-Andres, Klaus Elsner, Rainer Weidmann, Ralf Nenninger, and Michael Wei, and DE-OS P 43 37 613.4 and DE-PS P 43 37 613.4, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A transmission for a motor vehicle, said transmission comprising:

a flywheel fastened to rotate with a crankshaft of an internal combustion engine;

a transmission input shaft;

a clutch housing;

a clutch disc disposed within said housing, said clutch disc defining an axis of rotation and an axial direction parallel to said axis of rotation;

said clutch disc being disposed on said transmission input shaft;

a pressure plate for engaging and disengaging said clutch disc with said flywheel;

said clutch disc being disposed between said pressure plate and said flywheel, said clutch disc comprising friction lining means for contacting said flywheel and said pressure plate upon engagement of said clutch disc;

first means for biasing said pressure plate towards said flywheel, said biasing means being disposed between said clutch housing and said pressure plate;

means for adjusting the axial distance between said pressure plate and said flywheel upon wear of said friction lining means;

at least one means for sensing wear of said friction lining means, said at least one sensing means comprising:

projection means, said projection means comprising:
a first portion extending towards said adjusting means;
said first portion being operatively connected to said adjusting means to permit said adjusting means to adjust the axial distance between said pressure plate and said flywheel during a disengagement process of said clutch disc, which disengagement process follows an engagement process of said clutch disc wherein wear of said friction lining means has occurred; and
a second portion disposed in said pressure plate;

means for providing friction for frictionally positioning said second portion with respect to said pressure plate, said means for providing friction comprising means for permitting sliding axial movement, against said friction, of at least one of: said pressure plate, and said at least one sensing means, one with respect to the other;

said pressure plate having an outer circumference disposed about said axis of rotation and an inner circumference disposed within said outer circumference;

said at least one sensing means being disposed adjacent said outer circumference of said pressure plate;

said at least one sensing means further comprising means for receiving said second portion of said projection means, said means for receiving being disposed in said outer circumference of said pressure plate;

said means for receiving comprising a hole, said hole having a longitudinal axis defined substantially parallel to said axis of rotation;

said at least one sensing means further comprising means for limiting movement of said at least one sensing means towards said flywheel;

said adjusting means comprising:
a first ring portion and a second ring portion disposed axially adjacent one another;
said first ring portion and said second ring portion together having a width defined in a direction substantially parallel to said axis of rotation;
second means for biasing said first ring portion and said second ring portion to rotate with respect to one another to increase said width of said first and second ring portions upon wear of said friction lining means;
one of said first ring portion and said second ring portion being in contact with said pressure plate and the other one of said first ring portion and said second ring portion being in contact with said first biasing means;
said first ring portion and said second ring portion each having a first part and a second part, each of said first parts of said first and second ring portions and each of said second parts of said first and second ring portions having a width defined parallel to said axis of rotation;
said widths of said first parts of said first and second ring portions being substantially greater than said widths of said second parts of said first and second ring portions;

said first part of one of said first and second ring portions being in contact with said second part of the other one of said first and second ring portions;

said first and second parts of said first and second ring portions each comprising a surface portion disposed substantially perpendicular to said axis of rotation;

said surface portions of said first and second parts of said first and second ring portions each comprising one of the following a) and b):

a) substantially smooth, sloped areas extending continuously along and between said first parts and said second parts of said first and second ring portions; and b) a plurality of stepped areas extending along and between said first and second parts of said first and second ring portions;

said first portion of said projection means comprising a lever;

said second portion of said projection means comprising a pin;

said means for providing friction comprising a sleeve disposed in said hole of said pressure plate and about said pin, said sleeve being movable with respect to said pin, and said sleeve being biased radially outwardly in said hole;

said pin being fixedly attached to said lever on a side of said pressure plate facing away from said clutch disc;

said clutch housing comprising:
an outer circumference disposed about said axis of rotation; and
at least one opening disposed in said outer circumference of said clutch housing, said lever being disposed in said at least one opening to prevent rotational movement of said at least one sensing means with respect to said hole of said pressure plate;

said lever contacting said other one of said first ring portion and said second ring portion in contact with said first biasing means.

2. The transmission according to claim 1 wherein:

said first biasing means comprises a membrane spring, said membrane spring having an outer circumference disposed about said axis of rotation;

said membrane spring comprises at least one opening disposed adjacent said outer circumference of said membrane spring; and said lever being disposed in said at least one opening of said membrane spring.

3. The transmission according to claim 2 wherein:

said first ring portion is in contact with said pressure plate and said second ring portion is in contact with said membrane spring;

said at least one sensing means comprises a plurality of sensing means disposed in a spaced-apart relationship with respect to one another about said outer circumference of said pressure plate;

said means for receiving comprises a plurality of holes disposed in a spaced-apart relationship with respect to one another about said outer circumference of said pressure plate;

said at least one opening of said clutch housing comprises a plurality of openings disposed in a spaced-apart relationship with respect to one another about said outer circumference of said clutch housing;

said at least one opening of said membrane spring comprises a plurality of openings disposed in a spaced-apart relationship with respect to one another about said outer circumference of said membrane spring;

said pin has a first end and a second end, said first end of said pin being disposed adjacent said clutch disc and said second end of said pin being disposed adjacent said clutch housing;

said lever has a first end and a second end, said first end of said lever being disposed adjacent said second end of said pin and said second end of said lever contacting said second ring portion;

said means for limiting the movement of said at least one sensing means with respect to said flywheel comprises means for fixedly attaching said second end of said pin and said first end of said lever to said outer circumference of said clutch housing;

said clutch housing further comprises a cup-shaped portion, said cup-shaped portion comprising said plurality of openings of said clutch housing;

said friction clutch is configured as a pulled friction clutch;

said holes of said pressure plate each comprise a bushing disposed about corresponding ones of said sleeves, said bushing for preventing rust between said sleeves and said holes of said pressure plate;

said second biasing means comprises at least one tension spring, said at least one tension spring having a first end and a second end;

each of said first parts of said first and second ring portions comprises an opening;

said first end of said at least one tension spring is disposed in said opening of said first part of said first ring portion;

said second end of said at least one tension spring is disposed in said opening of said first part of said second ring portion;

said at least one tension spring is disposed on a side of said first and second ring portions facing away from said pin;

said first ring portion and said second ring portion having been formed from sheet metal strips;

each of said first ring portion and said second ring portion comprising one of the following c) and d):
c) a closed circumference; and
d) a gap extending through each of said first and second ring portions;

said means for providing friction further comprises means for increasing friction between said sleeves and said holes;

said pressure plate comprises a recessed portion disposed on said side of said pressure plate facing away from said clutch disc, said recessed portion extending into said pressure plate towards said clutch disc;

said first ring portion is disposed in said recessed portion of said pressure plate, to guide said first ring portion with respect to said pressure plate;

said pressure plate is attached to said clutch housing in an axially movable, but non-rotatable manner with respect to said clutch housing;

said clutch housing has an interior surface and an exterior surface, said interior surface facing said clutch disc and said exterior surface facing away from said interior surface; and a substantial portion of said lever is disposed adjacent said exterior surface of said clutch housing.

4. The transmission according to claim 1 wherein:

said first biasing means comprises a membrane spring;

said first ring portion is in contact with said pressure plate and said second ring portion is in contact with said membrane spring;

said at least one sensing means comprises a plurality of sensing means disposed in a spaced-apart relationship with respect to one another about said outer circumference of said pressure plate;

said means for receiving comprises a plurality of holes disposed in a spaced-apart relationship with respect to one another about said outer circumference of said pressure plate;

said at least one opening of said clutch housing comprises a plurality of openings disposed in a spaced-apart relationship with respect to one another about said outer circumference of said clutch housing;

said second ring portion comprises a plurality of recesses disposed on an opposite side of said second ring portion from said surface portions of said second ring portion;

said pin has a first end and a second end, said first end of said pin being disposed adjacent said clutch disc and said second end of said pin being disposed adjacent said clutch housing;

said lever has a first end and a second end, said first end of said lever being fixedly attached to said second end of said pin and said second end of said lever being disposed in a corresponding one of said recesses of said second ring portion;

said means for limiting the movement of said at least one sensing means with respect to said flywheel comprises a head disposed at said first end of said pin, said head being disposed outside of said hole of said pressure plate;

said head being configured for contacting said flywheel for preventing said plurality of sensing means from moving towards said flywheel;

said clutch housing further comprises a cup-shaped portion, said cup-shaped portion comprising said plurality of openings of said clutch housing;

said friction clutch is configured as a pushed friction clutch;

said hole of said pressure plate comprises a bushing disposed about corresponding ones of said sleeves, said bushing for preventing rust between said sleeve and said holes of said pressure plate;

said second biasing means comprises at least one tension spring, said at least one tension spring has a first end and a second end;

each of said first parts of said first and second ring portions comprises an opening;

said first end of said at least one tension spring is disposed in said opening of said first part of said first ring portion;

said second end of said at least one tension spring is disposed in said opening of said first part of said second ring portion;

said at least one tension spring is disposed on a side of said first and second ring portions facing away from said pin;

said first ring portion and said second ring portion having been formed from sheet metal strips;

each of said first ring portion and said second ring portion comprising one of the following c) and d):
c) a closed circumference; and
d) a gap extending through each of said first and second ring portions;

said means for providing friction further comprises means for increasing friction between said sleeves and said holes;

said pressure plate comprises a recessed portion disposed on said side of said pressure plate facing away from said clutch disc, said recessed portion extending into said pressure plate towards said clutch disc;

said first ring portion is disposed in said recessed portion of said pressure plate, to guide said first ring portion with respect to said pressure plate;

said pressure plate is attached to said clutch housing in an axially movable, but non-rotatable manner with respect to said clutch housing;

said clutch housing has an interior surface and an exterior surface, said interior surface facing said clutch disc and said exterior surface facing away from said interior surface; and a substantial portion of said lever is disposed at said interior surface of said clutch housing.

5. A transmission for a motor vehicle, said transmission comprising:

a flywheel fastened to rotate with a crankshaft of an internal combustion engine;

a transmission input shaft;

a clutch housing;

a clutch disc disposed within said housing, said clutch disc defining an axis of rotation and an axial direction parallel to said axis of rotation;

said clutch disc being disposed on said transmission input shaft;

a pressure plate for engaging and disengaging said clutch disc with said flywheel;

said clutch disc being disposed between said pressure plate and said flywheel, said clutch disc comprising friction lining means for contacting said flywheel and said pressure plate upon engagement of said clutch disc;

first means for biasing said pressure plate towards said flywheel, said biasing means being disposed between said clutch housing and said pressure plate;

means for adjusting the axial distance between said pressure plate and said flywheel upon wear of said friction lining means;

at least one means for sensing wear of said friction lining means, said at least one sensing means comprising:
projection means, said projection means comprising:
a first portion extending towards said adjusting means;
said first portion being operatively connected to said adjusting means to permit said adjusting means to adjust the axial distance between said pressure plate and said flywheel during a disengagement process of said clutch disc, which disengagement process follows an engagement process of said clutch disc wherein wear of said friction lining means has occurred; and
a second portion disposed in said pressure plate;

means for providing friction for frictionally positioning said second portion with respect to said pressure plate, said means for providing friction comprising means for permitting sliding axial movement, against said friction, of at least one of: said pressure plate, and said at least one sensing means, one with respect to the other;

said pressure plate having an outer circumference disposed about said axis of rotation and an inner circumference disposed within said outer circumference;

said at least one sensing means being disposed adjacent said outer circumference of said pressure plate;

said at least one sensing means further comprising means for receiving said second portion of said projection means, said means for receiving being disposed in said outer circumference of said pressure plate;

said means for receiving comprising a hole, said hole having a longitudinal axis defined substantially parallel to said axis of rotation;

said at least one sensing means further comprising means for limiting movement of said at least one sensing means towards said flywheel;

said adjusting means comprising:

a first ring portion and a second ring portion disposed axially adjacent one another;

said first ring portion and said second ring portion together having a width defined in a direction substantially parallel to said axis of rotation;

second means for biasing said first ring portion and said second ring portion to rotate with respect to one another to increase said width of said first and second ring portions upon wear of said friction lining means;

one of said first ring portion and said second ring portion being in contact with said pressure plate and the other one of said first ring portion and said second ring portion being in contact with said first biasing means;

said first ring portion and said second ring portion each having a first part and a second part, each of said first parts of said first and second ring portions and each of said second parts of said first and second ring portions having a width defined parallel to said axis of rotation;

said widths of said first parts of said first and second ring portions being substantially greater than said widths of said second parts of said first and second ring portions;

said first part of one of said first and second ring portions being in contact with said second part of the other one of said first and second ring portions;

said first and second parts of said first and second ring portions each comprising a surface portion disposed substantially perpendicular to said axis of rotation;

said surface portions of said first and second parts of said first and second ring portions each comprising one of the following a) and b):

a) substantially smooth, sloped areas extending continuously along and between said first parts and said second parts of said first and second ring portions; and b) a plurality of stepped areas extending along and between said first and second parts of said first and second ring portions;

said first portion of said projection means comprising a lever;

said second portion of said projection means comprising a pin;

said means for providing friction comprising a sleeve disposed in said hole of said pressure plate and about said pin, said sleeve being movable with respect to said pin, and said sleeve being biased radially outwardly in said hole;

said pin being fixedly attached to said lever on a side of said pressure plate facing away from said clutch disc;

said clutch housing comprising:

an outer circumference disposed about said axis of rotation; and at least one opening disposed in said outer circumference of said clutch housing, said lever being disposed in said at least one opening to prevent rotational movement of said at least one sensing means with respect to said hole of said pressure plate;

said first biasing means being disposed between said lever and said other one of said first ring portion and said second ring portion in contact with said first biasing means, said lever contacting said first biasing means;

said first biasing means comprising a membrane spring;

said first ring portion being in contact with said pressure plate and said second ring portion being in contact with said membrane spring;

said at least one sensing means comprising a plurality of sensing means disposed in a spaced-apart relationship with respect to one another about said outer circumference of said pressure plate;

said means for receiving comprising a plurality of holes disposed in a spaced-apart relationship with respect to one another about said outer circumference of said pressure plate;

said at least one opening of said clutch housing comprising a plurality of openings disposed in a spaced-apart relationship with respect to one another about said outer circumference of said clutch housing;

said pin having a first end and a second end, said first end of said pin being disposed adjacent said clutch disc and said second end of said pin being disposed adjacent said clutch housing;

said lever having a first end and a second end, said first end of said lever being fixedly attached to said second end of said pin and said second end of said lever contacting said membrane spring;

said means for limiting the movement of said at least one sensing means with respect to said flywheel comprising a head disposed at said first end of said pin, said head being disposed outside of said hole of said pressure plate;

said head being configured for contacting said flywheel for preventing said plurality of sensing means from moving towards said flywheel;

said clutch housing further comprising a cup-shaped portion, said cup-shaped portion comprising said plurality of openings of said clutch housing;

said friction clutch being configured as a pushed friction clutch;

said holes of said pressure plate each comprising a bushing disposed about corresponding ones of said sleeves, said bushing for preventing rust between said sleeves and said holes of said pressure plate;

said second biasing means comprising at least one tension spring, said at least one tension spring having a first end and a second end;

each of said first parts of said first and second ring portions comprising an opening;

said first end of said at least one tension spring being disposed in said opening of said first part of said first ring portion;

said second end of said at least one tension spring being disposed in said opening of said first part of said second ring portion;

said at least one tension spring being disposed on a side of said first and second ring portions facing away from said pin;

said first ring portion and said second ring portion having been formed from sheet metal strips;

each of said first ring portion and said second ring portion comprising one of the following c) and d):

c) a closed circumference; and d) a gap extending through each of said first and second ring portions;

said means for providing friction further comprising means for increasing friction between said sleeves and said holes;

said pressure plate comprising a recessed portion disposed on said side of said pressure plate facing away from said clutch disc, said recessed portion extending into said pressure plate towards said clutch disc;

said first ring portion being disposed in said recessed portion of said pressure plate, to guide said first ring portion with respect to said pressure plate;

said pressure plate being attached to said clutch housing in an axially movable, but non-rotatable manner with respect to said clutch housing;

said clutch housing having an interior surface and an exterior surface, said interior surface facing said clutch disc and said exterior surface facing away from said interior surface; and a substantial portion of said lever being disposed at said interior surface of said clutch housing.

* * * * *

UNITED STATES PATENT AND TRADEMARK OFFICE
CERTIFICATE OF CORRECTION

PATENT NO. : 5,560,463
DATED : October 1, 1996
INVENTOR(S) : Achim LINK, Reinhold WEIDINGER, Heiko SCHULZ-ANDRES, Klaus ELSNER, Rainer WIEDMANN, Ralf NENNINGER, and Michael WEISS It is certified that error appears in the above-indentified patent and that said Letters Patent is hereby corrected as shown below:

On the title page, item [75], after 'Michael', delete "Weib" and insert --Weiss--.

On the title page, item [56], after "References Cited" insert the following U.S. Patent Documents section:

--U.S. PATENT DOCUMENTS

| | | |
|---|---|---|
| 5320205 | 6/1994 | Kummer et al. |
| 5349882 | 9/1995 | Kamio |
| 5419418 | 5/1995 | Uenohara et al. |
| 5431268 | 7/1995 | Mizukami et al.--. |

Signed and Sealed this

Twenty-fifth Day of February, 1997

Attest:

BRUCE LEHMAN

*Attesting Officer*     *Commissioner of Patents and Trademarks*